United States Patent [19]
Hall

[11] Patent Number: 5,739,299
[45] Date of Patent: Apr. 14, 1998

[54] MONOAZO DYES WHICH ARE FREE FROM WATER-SOLUBILIZING GROUPS AND WHICH CONTAIN A FLUOROSULPHONYL GROUP AND PROCESS FOR COLOURING POLYAMIDES AND POLYESTER MATERIALS THEREWITH

[75] Inventor: Nigel Hall, Bury, United Kingdom

[73] Assignee: Zeneca Limited, London, England

[21] Appl. No.: 676,234

[22] PCT Filed: Dec. 30, 1994

[86] PCT No.: PCT/GB94/02831

§ 371 Date: Jul. 15, 1996

§ 102(e) Date: Jul. 15, 1996

[87] PCT Pub. No.: WO95/20014

PCT Pub. Date: Jul. 27, 1995

[30] Foreign Application Priority Data

Jan. 19, 1994 [GB] United Kingdom ............... 9400972

[51] Int. Cl.⁶ .................. C09B 62/825; C09B 29/01; C09B 29/033; C09B 29/08; D06P 3/26; D06P 3/82
[52] U.S. Cl. .............. 534/734; 534/573; 8/639; 8/662
[58] Field of Search ............... 534/734, 157; 8/662, 639

[56] References Cited

U.S. PATENT DOCUMENTS

| | | | |
|---|---|---|---|
| 2,154,186 | 4/1939 | Schweitzer et al. | 534/734 |
| 2,427,995 | 9/1947 | Parker et al. | 534/734 |
| 2,436,697 | 2/1948 | Lecher et al. | 534/734 |
| 2,437,644 | 3/1948 | Lecher et al. | 534/734 |
| 2,576,037 | 11/1951 | Parker et al. | 534/734 |
| 3,131,021 | 4/1964 | Baird et al. | 534/734 |
| 3,929,760 | 12/1975 | Landholm et al. | 534/648 |
| 4,013,635 | 3/1977 | Landholm et al. | 534/734 X |
| 4,385,104 | 5/1983 | Krutak et al. | 430/17 |
| 4,414,152 | 11/1983 | Santilli et al. | 534/734 |
| 4,435,320 | 3/1984 | Gourley | 534/734 |

FOREIGN PATENT DOCUMENTS

| | | | |
|---|---|---|---|
| 807 732 | 1/1937 | France | 534/734 |
| 1 192 485 | 10/1959 | France | 534/734 |
| 1 193 706 | 11/1959 | France | 534/734 |
| 2 302 327 | 9/1976 | France | 534/648 |
| 2557523 | 7/1956 | Germany | 534/734 |
| 0953104 | 11/1956 | Germany | 534/734 |
| 819 664 | 9/1959 | United Kingdom | 534/734 |
| 856 348 | 12/1960 | United Kingdom | 534/734 |
| 2 108 993 | 5/1983 | United Kingdom | 534/734 |

*Primary Examiner*—Floyd D. Higel
*Attorney, Agent, or Firm*—Cushman Darby & Cushman IP Group Pillsbury Madison & Sutro LLP

[57] ABSTRACT

A process for coloring a synthetic textile material or fibre blend thereof which comprises applying to the synthetic textile material a compound or mixture thereof, which is free from water solubilizing groups, of Formula (1):

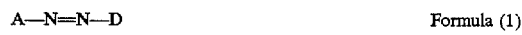

A—N=N—D          Formula (1)

wherein

A and D each independently is an optionally substituted heterocyclic or carbocyclic group and at least one of A or D carries directly at least one —$SO_2F$ group or carries a substituent to which at least one —$SO_2F$ group is attached except for 4-(4-fluorosulphonylphenylazo)-N,N-dimethylaniline, provided that one of A or D is not 3,5-difluorosulphonylthien-2-yl, optionally substituted 1-phenyl-pyrazol-4-yl-5-one or

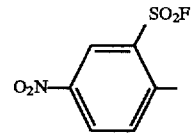

or that one of A or D does not carry an —$NCH_2CH(OH)CH_2Cl$, —$NCOCH_2Cl$ or —$NCH_2CH_2SO_2F$ substituent.

The presence of one or more —$SO_2F$ groups in a dye molecule generally improves the properties of that dye and confers surprisingly good wet fastness and light fastness properties.

22 Claims, No Drawings

MONOAZO DYES WHICH ARE FREE FROM WATER-SOLUBILIZING GROUPS AND WHICH CONTAIN A FLUOROSULPHONYL GROUP AND PROCESS FOR COLOURING POLYAMIDES AND POLYESTER MATERIALS THEREWITH

This application claims benefit of international application PCT/GB94/02831, filed Dec. 30, 1994.

The present invention relates to a process for colouring synthetic textile materials, to synthetic textiles when coloured, to a process for the mass coloration of plastics, to plastics when coloured, to certain novel azo dyes and to compositions containing azo dyes.

GB-A-856,348 relates to water insoluble monoazo dyestuffs and discloses one specific dye containing a 4-fluorosulphonylnaphth-1-yl group which is disclaimed from the present claims.

GB-A-819,664 relates to water insoluble monoazo dyestuffs and discloses two specific dyes both of which are disclaimed from the present claims.

U.S. Pat. No. 2,576,037 relates to the coloration of cellulose acetate with certain —$SO_2F$ containing azo dyes. Such dyes, particularly those which also contain —$NC_2H_4OH$ groups or derivatives thereof are dye bath unstable and as such are unsuitable for coloration of polyester textile materials.

According to the present invention there is provided a process for colouring polyamide and aromatic polyester textile material or fibre blend thereof which comprises applying to the synthetic textile material a compound or mixture thereof, which is free from water solubilising groups, of Formula (1):

Formula (1)

wherein

A and D each independently is an optionally substituted heterocyclic or carbocyclic group and at least one of A or D carries directly at least one —$SO_2F$ group or carries a substituent to which at least one —$SO_2F$ group is attached except for 4-(4-fluorosulphonylphenylazo)-N,N-dimethylaniline, provided that one of A or D is not 3,5-difluorosulphonylthien-2-yl, optionally substituted 1-phenyl-pyrazol-4-yl-5-one, 4-fluorosulphonylnaphth-1-yl or

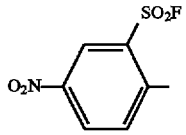

or that one of A or D does not carry an —$NCH_2CH(OH)CH_2Cl$, —$NCOCH_2Cl$ or —$NCH_2CH_2SO_2F$ substituent.

Different compounds of Formula (1) may be mixed or the compounds of Formula (1) may be mixed with dyes which do not contain an —$SO_2F$ group. The mixtures may be simple physical mixtures or may be mixed crystals formed for example by co-crystallisation. Such mixtures generally show improvement in dyeing properties. Crystalline modifications of compounds of Formula (1) exist and it is intended that the present definition includes such crystalline modifications which may be formed by heat treatment.

The presence of one or more —$SO_2F$ groups in a dye molecule generally improves the properties of that dye and confers surprisingly good wet-fastness and light-fastness properties.

According to a first embodiment of the present invention there is provided a process for colouring a synthetic textile material or fibre blend thereof which comprises applying to the synthetic textile material a compound or mixture thereof, which is free from water solubilising groups, of Formula (1) wherein A and D each independently is an optionally substituted heterocyclic or carbocyclic group in which at least one of A or D carries directly at least one —$SO_2F$ group or carries a substituent to which at least one —$SO_2F$ group is attached and at least one of A or D carries directly at least one ester group or carries a substituent to which at least one ester group is attached.

Azo dyes containing both an —$SO_2F$ and an ester group have improved performances in wash fastness properties over azo dyes carrying only an —$SO_2F$ group.

The synthetic textile material may be selected from secondary cellulose acetate, cellulose triacetate, polyamide, polyacrylonitrile and aromatic polyester. The synthetic textile material is preferably polyamide or aromatic polyester, more preferably aromatic polyester such as polyhexamethylene adipamide or polyethylene terephthalate and especially polyethlene terephthalate. Fibre blends may comprise mixtures of different synthetic textile materials or mixtures of synthetic and natural textile materials. Preferred fibre blends are those of polyester cellulose such as polyester-cotton. The textile materials or blends thereof may be in the form of filaments, loose fibres, yarn, woven or knitted fibres.

According to a second embodiment of the present invention there is provided a process for colouring a polyester textile material or fibre blend thereof which comprises applying to the polyester textile material a compound or mixture thereof, which is free from water solubilising groups, of Formula (1) in which A and D are as herein before defined except for 4-(4-fluorosulphonylphenylazo)-N,N-dimethylaniline, provided that one of A or D is not 3,5-difluorosulphonylthien-2-yl, optionally substituted 1-phenylpyrazol-4-yl-5-one, 4-fluorosulphonylnaphth-1-yl or 4-nitro-2-fluorosulphonylphenyl or that one of A or D does not carry an —$NCH_2CH_2SO_3F$ substitutent.

The dyes of Formula (1) preferably have low solubility in water, typically less than 1% preferably less than 0.5% and especially less than 0.2% solubility in water. The dyes of Formula (1) are thus free from water solubilising groups such as —$SO_3H$, —$CO_3H$, —$PO_3H$ and quaternary amino.

The compounds of Formula (1), optionally in conjunction with other disperse dyes may be applied to the synthetic textile materials or fibre blends thereof by methods which are conventionally employed in dyeing disperse dyes to such materials and fibre blends.

The process conditions may be selected from the following:

i) exhaust dyeing at a pH of from 4 to 6.5, an a temperature of from 125° C. to 140° C. for from 10 to 120 minutes and under a pressure of from 1 to 2 bar, a sequestrant may be optionally be added;

ii) continuous dyeing at a pH of from 4 to 6.5, at a temperature of from 190° C. to 225° C. for from 15 seconds to 5 minutes, a migration inhibitor may optionally be added;

iii) printing direct at a pH of from 4 to 6.5, at a temperature of from 160° C. to 185° C. for 4 to 15 minutes for high temperature steaming, or at a temperature of from 190° C. to 225° C. for 15 seconds to 5 minutes for bake fixation with dry heat or at a temperature of from 120° C. to 140° C. and 1 to 2 bar for 10 to 45 minutes for pressure steaming, wetting agents and thickeners (such as alginates) of from 5 to 100% by weight of the dye may be optionally be added;

iv) discharge printing (by padding the dye onto the textile material, drying and overprinting) at a pH of from 4 to 6.5, migration inhibitors and thickeners may optionally be added;

v) carrier dyeing at a pH of from 4 to 6.5, at a temperature of from 95° C. to 100° C. using a carrier such as methylnaphthalene, diphenylamine or 2-phenylphenol, sequesterants may optionally be added; and vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequesterants may optionally be added.

In all the above processes the compound of Formula (1) is applied as a dispersion comprising from 0.001% to 4% of the compound in aqueous medium.

The present compounds generally provide coloured textile material which shows good fastness to washing, light and heat.

The heterocyclic group represented by A and D may be selected from thienyl, thiazolyl, isothiazolyl, pyrazolyl, imidazolyl, pyridyl, pyridonyl, 1,2,4- and 1,3,4-thiadiazolyl, furanyl, pyrrolyl, pyridazyl, pyrimidyl, pyrazinyl, benzothiazolyl, benzoisothiazolyl, quinolinyl, isoquinolinyl, indolyl, pyridothiazolyl, pyridoisothiazolyl, 1,2,3-triazolyl and 1,2,4-triazolyl. The carbocyclic group represented by A or D may be phenyl or naphthyl.

For the avoidance of doubt optionally substituted isoquinolinyl represented by A includes structures of the formula:

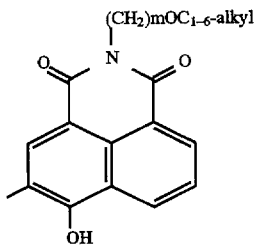

in which m is from 1 to 4 and m is preferably 3.

A and D each independently is preferably thienyl, phenol, naphthyl, thiazolyl, isothiazolyl, pyridonyl, quinolinyl more preferably thien-2-yl, phenyl, naphth-1-yl, naphth-2-yl, thiazol-2-yl, isothiazol-5-yl, pyrid-4-one-5-yl or quinolinyl. A is especially preferably thien-2-yl or phenyl and D is especially preferably phenyl or naphth-1-yl.

Examples of suitable substituents for A and D are cyano, hydroxy, nitro, fluoro, chloro, bromo, iodo, fluorosulphonyl, trifluoromethyl, alkyl, alkoxy, aryl, aryloxy, fluorosulphonylaryl, fluorosulphonylaryloxy, —COalkyl, —COOalkyl, —OCOalkyl, —COaryl, —COOaryl, —OCOaryl, —NHCOalkyl, —NHCOaryl, —NHSO$_2$alkyl, —NHSO$_2$aryl, —Salkyl, —Saryl, —SO$_2$alkyl, —SO$_2$aryl, —SCN or —NR$^2$R$^1$ in which R$^1$ and R$^2$ each independently is —H, alkyl, aryl or cycloalkyl all the alkyl, alkoxy, aryl, aryloxy parts of the above substituents for A, D, R$^1$ and R$^2$ may optionally be substituted by —OH, —CN, —F, —Cl, —Br, —I, —SO$_2$F, alkoxy, alkenyl, phenyl, phenylSO$_2$F, aryloxy, aryloxySO$_2$F, —N(alkyl)$_2$, —OCOalkyl, —OCOalkylCl, —COOalkyl, —COOalkylOH, —COOalkylCN, —COOalkylCOalkyl, —COOalkylphenyl, —OCOphenyl, —COphenylSO$_2$F, —OCOphenylNO$_2$, —OCOphenylalkyl, —OCOphenylalkoxy, —COOphenyl, —OCO(fluorosulphonylphenyl), —OalkylCN, —COOalkylOalkyl, —COOalkylOphenyl, —OCOalkylOphenyl, —COOalkylOalkylOalkyl, —OCOalkylCOOalkyl, —OalkylCOOalkyl, —OalkylCOOalkylOalkyl, —OalkylCOOalkylCOOalkyl, —OalkylOCOalkylOalkyl, —COOalkylOCOalkyl or —COOalkylCOOalkyl,

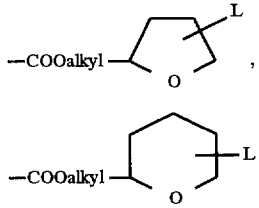

in which L is —H or alkyl.

In all of the suitable substituents for A and D each alkyl is preferably $C_{1-10}$-alkyl, each alkoxy is preferably $C_{1-10}$-alkoxy, each alkenyl is preferably $C_{2-8}$-alkenyl each of which may be straight or branched chain, each aryl is preferably phenyl or naphthyl and each heterocyclic group may be any of the groups described above for A and D and each alkyl, alkoxy, alkenyl, aryl, heterocyclic or phenyl group may carry an —SO$_2$F substituent. R$^1$ and R$^2$ together with the —N atom to which they are attached may form a 5- or 6-membered ring such as morpolino or piperidino.

A further suitable substituent for A and D is a group of Formula R$^{19}$—N—Y—X—W in which Y is a direct link or C═O, X is a direct link, optionally substituted alkyl, alkenyl, aryl, heterocyclic, alkylOalkyl, alkylNHalkyl or —NR$^{20}$—Z— or —O—Z— in which Z is optionally substituted alkyl, alkenyl, aryl, heterocyclic, alkylOalkyl, alkylNHalkyl or a direct link and R$^{20}$ is —H, optionally substituted alkyl, aryl or alkylaryl, W is —CO$_2$R$^{21}$, —OCOR$^{21}$, —OH or —CN in which R$^{21}$ is optionally substituted alkyl, aryl, alkylaryl, alkylOalkyl or alkylOH, R$^{19}$ is —H or optionally substituted alkyl.

Where X, Z, R$^{19}$, R$^{20}$ or R$^{21}$ is or contains alkyl it is preferably $C_{1-8}$-alkyl more preferably $C_{1-6}$-alkyl each of which may be straight or branched chain or cyclic alkyl. Where X or Z is alkenyl it is preferably $C_{2-8}$-alkenyl which may be straight or branched chain or cyclic alkenyl. Where X, Z, R$^{20}$ or R$^{21}$ is aryl it is preferably phenyl or naphthyl more preferably phenyl. Where X or Z is heterocyclic it may be selected from any of the heterocyclic groups defined above for A. Where X, Z or R$^{21}$ is alkylOalkyl it is preferably $C_{1-6}$-alkylOC$_{1-6}$-alkyl each alkyl may be straight or branched chain and the alkylOalkyl group may be cyclic ether. Where X or Z is alkylNHalkyl it is preferably $C_{1-6}$-alkylNHC$_{1-6}$-alkyl in which each alkyl may be straight or branched chain and the alkylNHalkyl group may be a cyclic amine. Where R$^{20}$ or R$^{21}$ is alkylaryl it is preferably $C_{1-6}$-alkylaryl more preferably $C_{1-6}$-alkylphenyl and especially benzyl or ethylphenyl. Where R$^{21}$ is alkylOH it is preferably $C_{1-6}$-alkylOH.

The optional substituents for any of the groups represented by X, Z, R$^{19}$, R$^{20}$ or R$^{21}$ may be selected from any of the optional substituents listed for A, D, R$^1$ or R$^2$.

Preferred substituents for A and D are cyano, nitro, chloro, bromo, fluorosulphonyl, $C_{1-6}$-alkyl, $C_{1-6}$-alkoxy, —COC$_{1-6}$-alkyl, —NHCOC$_{1-6}$-alkyl, —OCOC$_{1-6}$-alkyl, —COOC$_{1-6}$-alkyl, phenoxy, 4—SO$_2$Fphenoxy, R$^{19}$N—Y—X—W in which R$^{19}$, Y, X and W are as herein before defined, and —NR$^1$R$^2$ in which R$^1$ and R$^2$ each independently is —H, $C_{1-6}$-alkyl, $C_{1-6}$-alkyl substituted by —OH, —CN, —Cl, phenyl, —OCOC$_{1-6}$-alkyl, —COOC$_{1-6}$-alkyl,

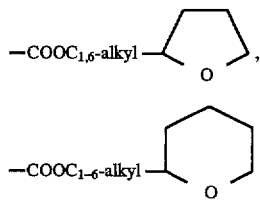

—C$_{1-6}$-alkyl(4-fluorosulphonylphenyl), —OCO(3-fluorosulphonylphenyl), —OCO(4-fluorosulphonylphenyl), —C$_{2-4}$-alkenyl, —COOC$_{1-6}$-alkylOC$_{1-6}$-alkyl, —OC$_{1-6}$-alkylCN, —OC$_{1-6}$-alkylOCOC$_{1-6}$-alkylOC$_{1-6}$-alkyl, —COOalkylOCOalkyl and —COOalkylCOOalkyl or where $R^1$ and $R^2$ together with the —N atom to which they are attached form a morpholino or piperidino ring.

The compounds of Formula (1) preferably carry a total of from one to three —SO$_2$F groups, more preferably one or two —SO$_2$F groups and especially one —SO$_2$F groups.

The compounds of Formula (1) more preferably carry one —SO$_2$F group and one ester group.

A number of compounds of Formula (1) used in the above coloration process are novel and according to a further feature of the present invention there is provided a compound which is free from watersolubilising groups of Formula (2):

$$A^1\text{—}N\text{=}N\text{—}D^1 \quad \text{Formula (2)}$$

in which:

$A^1$ and $D^1$ each independently is an optionally substituted heterocyclic or carbocyclic group and at least one of $A^1$ or $D^1$ carries directly at least one —SO$_2$F group or carries a substituent to which at least one —SO$_2$F group is attached except for 4-(4-fluorosulphonylphenylazo)-N,N-dimethylaniline,
4-(4-fluorosulphonylphenylazo)-N,N-dimethylaniline,
4-(4-fluorosulphonylphenylazo)-N-ethyl-N-acetoxyethylaniline,
1-(5-fluorosulphonyl-2-methylphenylazo)-2-hydroxynaphthalene,
4-(4-fluorosulphonylphenylazo)-3-(trifluoromethylcarbonylamino)-N-ethyl-N-2-methoxyethyl)aniline,
4-(4-fluorosulphonylphenylazo)-3-(trifluoromethylcarbonylamino)-N-ethyl-N-2-cyanoethyl)aniline,
4-(4-fluorosulphonylphenylazo)-2,5-dimethyl-N-ethyl-N-(2-methoxyethyl)aniline,
4-(4-fluorosulphonylphenylazo)-2,5-dimethyl-N-ethyl-N-(2-cyanoethyl)aniline,
4-(4-fluorosulphonylphenylazo)-N-ethyl-N-(2-fluorosulphonylethyl)aniline,
4-(4-fluorosulphonylphenylazo)-N,N-di(2-fluorosulphonylethyl)aniline,
4-(3-fluorosulphonyl-4-methylphenylazo)-3-(trifluoromethylcarbonylamino)-N-ethyl-N-(2-methoxyethyl)aniline,
4-(3-fluorosulphonyl-4-methylphenylazo)-2,5-dimethyl-N-ethyl-N-(2-methoxyethyl)aniline,
4-(3-fluorosulphonyl-4-chlorophenylazo)-3-(trifluoromethylcarbonylamino)-N-ethyl-N-(2-methoxyethyl)aniline,
4-(3-fluorosulphonyl-4-chlorophenylazo)-2,5-dimethyl-N-ethyl-N-(2-methoxyethyl)aniline,
4-(5-fluorosulphonyl-2-methylphenylazo)-1-aminonaphthalene,
4-(5-fluorosulphonyl-2-methylphenylazo)-2-ethoxyaniline,
4-(3-fluorosulphonylphenylazo)-2,5-dimethoxyaniline,
4-(2-chloro-4-nitrophenylazo)-2-methyl-5-fluorosulphonylaniline,
4-(5-fluorosulphonyl-2-methylphenylazo)-N,N-di(2-hydroxyethyl)aniline,
4-(5-fluorosulphonyl-2-methylphenylazo)-N-(2-hydroxyethyl)aniline,
4-(5-fluorosulphonyl-2-methylphenylazo)-N,N-diethylaniline,
4-(5-fluorosulphonyl-2-methylphenylazo)-N,N-di(2-hydroxyethyl)-3-methylaniline,
4-(5-fluorosulphonyl-2-chlorophenylazo)-N,N-di(2-hydroxyethyl)aniline,
4-(3-fluorosulphonylphenylazo)-N,N-di(2-hydroxyethyl)-3-methylaniline,
4-(4-fluorosulphonylphenylazo)-N,N-di(2-hydroxyethyl) aniline,
4-(5-fluorosulphonyl-2-methoxyphenylazo)-N,N-di(2-hydroxyethyl)aniline,
4-(5-fluorosulphonyl-2-methylphenylazo)-N-ethyl-N-(((2-methoxy)-2-ethoxy)ethyl)aniline,
4-(5-fluorosulphonyl-2-chlorophenylazo)-N-ethyl—N(((2-methoxy)-2-ethoxy)ethyl)aniline, 4-(3-fluorosulphonylphenylazo)-N-ethyl-N(((2-methoxy)-2-ethoxy)ethyl)aniline,
4-(4-fluorosulphonylphenylazo)-N-ethyl-N(((2-methoxy)-2-ethoxy)ethyl)aniline,
4-(5-fluorosulphonyl-2-methoxyphenylazo)-N-ethyl-N((2-methoxy)-2-ethoxy)ethyl)aniline,
4-(5-fluorosulphonyl-2-methylphenylazonaphth-1-ylamine,
4-(5-fluorosulphonyl-2-methylphenylazo)-2-ethoxyaniline,
4-(3-fluorosulphonyl(phenylazo)-3,6-dimethoxyaniline, provided that $A^1$ is not 3,5-difluorosulphonylthien-2-yl, optionally substituted pyrazol-4-yl-5-one or N-allylpyrid-2-one-5-yl and provided that $A^1$ is not

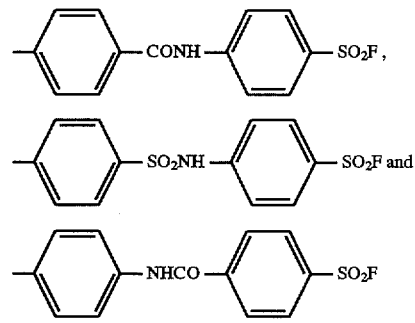

when $D^1$ carries an —NCH$_2$CH(OH)CH$_2$Cl substituent and provided than one of $A^1$ or $D^1$ is not 4-fluorosulphonylnaphth-1-yl, substituted 4-hydroxynapth-1-yl or

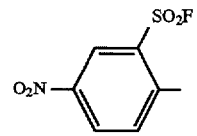

and provided than $A^1$ is not a fluorosulphonylphenyl group when $D^1$ is an arylamide of an aromatic 2-hydroxycarboxylic acid.

$A^1$ and $D^1$ each independently may be any of the heterocyclic groups defined for A above. $A^1$ and $D^1$ each independently may be any of the carbocyclic groups defined for A and D above.

$A^1$ and $D^1$ each independently is preferably thienyl, phenyl, naphthyl, thiazolyl, isothiazolyl or pyridonyl, more preferably thienyl, phenyl, thiazolyl, isothiazolyl or pyridonyl and especially thien-2-yl, phenyl, thiazol-2-yl, isothiazol-5-yl or pyrid-4-one-5-yl.

$D^1$ is preferably phenyl.

Preferred compounds of Formulae (1) and (2) are those in which A or $A^1$ is phenyl and D or $D^1$ is phenyl; A or $A^1$ is thien-2-yl and D or $D^1$ is phenyl; and A or $A^1$ is phenyl and D or $D^1$ is naphth-1-yl.

The optional substituents for $A^1$ and $D^1$ are any of those defined for A and D above.

A preferred sub-group of compounds of Formula (1) are those of Formula (3):

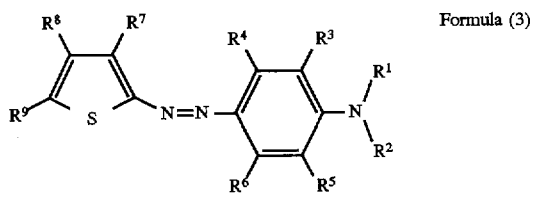

Formula (3)

wherein $R^1$ and $R^2$ each independently is —H or optionally substituted $C_{1-6}$-alkyl or optionally substituted aryl;

$R^3$, $R^4$, $R^5$ and $R^6$ each independently is —H, —F, —Cl, —Br, —I, —$SO_2F$ or $C_{1-6}$-alkyl, $C_{1-6}$-alkoxy, $C_{1-6}$-alkanoylamino, —$NHSO_2$alkyl or Ophenyl each of which may be optionally substituted;

$R^7$, $R^8$ and $R^9$ each independently is —H, $C_{1-6}$-alkyl, —$NO_2$, —$COOC_{1-6}$-alkyl, —OCOalkyl, —Cl, —F, —Br, —I, —$COC_{1-6}$-alkyl, —CN, formyl, protected formyl or —$SO_2F$ provided that at least one of $R^1$ to $R^9$ is —$SO_2F$ or carries a substituent to which at least one —$SO_2F$ group is attached and provided that $R^7$ and $R^9$ are not both —$SO_2F$.

Where $R^7$, $R^8$ and $R^9$ is or contains alkyl the alkyl may be optionally subustituted.

Protected formyl groups include for example oxazolidone, imidazoline, thiazolidine, bisulphite, cyanohydrin, hydrazone and oxime.

The compounds of Formula (3) are novel and accordingly are a further aspect of the present invention.

The optional substituents for groups represented by $R^1$ to $R^9$ may be selected from any of the substituents described above for A and D. The optional substituents for $R^1$ to $R^9$ are preferably —CN, —OH, —$OCOC_{1-6}$-alkyl, —$COOC_{1-6}$-alkyl, phenyl, —OCOphenyl, —$OCOphenylSO_2F$, phenyl$SO_2F$, —Ophenyl$SO_2F$, —$CO_2$phenyl$SO_2F$, —$COOC_{1-6}$-alkyl$OCOC_{1-6}$-alkyl and —$COOC_{1-6}$-alkyl$COOC_{1-6}$-alkyl.

Preferred compounds of Formula (3) are those in which $R^1$ and $R^2$ each independently is —$CH_2$, —$C_2H_5$, —$C_2H_4CN$, —$C_2H_4OH$, —$CH(CH_2)CH_2CH_3$, —$C_4H_9$, —$CH_2(4$-fluorosulphonylphenyl), —$C_2H_4(4$-fluorosulphonylphenyl), —$C_3H_7(4$-fluorosulphonylphenyl), $R^3$, $R^4$, $R^5$ and $R^6$ each independently is —H, —Cl, —$CH_2$, —$OCH_2$, —$NHCOCH_2$, —$NHCOC_2H_5$, —$NHSO_2CH_3$ or —$SO_2F$ and $R^7$, $R^8$ and $R^9$ each independently is —H, —$NO_2$, —CN, —$COCH_2$, —$COOC_2H_5$, —$SO_2F$ or —$CH_3$ provided that both $R^7$ and $R^9$ are not —$SO_2F$.

Especially preferred compounds of Formula (3) are those in which $R^1$ and $R^2$ each independently is —$C_2H_4CN$, —$C_2H_5$ or (4-fluorosulphonylphenyl) $C_{1-6}$-alkyl;

$R^3$ is —H, —$OCH_3$, —$CH_3$ or —$SO_2F$;

$R^4$ and $R^5$ each independently is —H, —Cl or —$SO_2F$;

$R^6$ is —H, —$NHCOCH_3$, —$NHCOC_2H_5$, —$CH_3$ or —$SO_2F$;

$R^7$ is —$NO_2$, —$COCH_3$, —$COOC_2H_5$ or —$SO_2F$;

$R^8$ is —H, —$SO_2F$ or —Cl;

$R^9$ is —$NO_2$, —$SO_2F$ or —CHO.

A further preferred sub-group of compounds of Formula (1) are those of Formula (4):

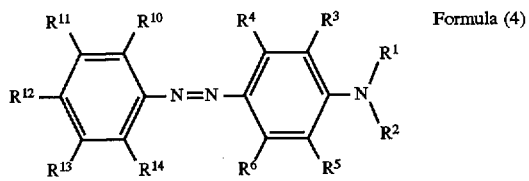

Formula (4)

wherein $R^1$ to $R^6$ are as hereinbefore defined;

$R^{10}$ to $R^{14}$ each independently is —H, alkoxy, alkyl, —$NO_2$, —$SO_2F$, —F, —Cl, —Br, —I or —CN; provided that when $R^{10}$ is $SO_2F$, $R^{12}$ is not —$NO_2$ and $R^{11}$, $R^{13}$ and $R^{14}$ are not all —H.

Where a group represented by $R^{10}$ to $R^{14}$ is alkyl it is preferably $C_{1-10}$-alkyl, more preferably $C_{1-6}$-alkyl. Where a group represented by $R^{10}$ to $R^{14}$ is alkoxy it is preferably $C_{1-10}$-alkoxy more preferably $C_{1-6}$-alkoxy.

Compounds of Formula (4) are preferably those in which $R^1$ and $R^2$ each independently is —$CH_3$, —$C_2H_5$, —$C_3H_7$, —$C_4H_9$, —$C_5H_{11}$, —$C_6H_{13}$, —$CH(CH_3)CH_2CH_3$, —$CH_2$phenyl, —$C_2H_4$phenyl, —$C_3H_6$phenyl, —$C_2H_4CN$, —$C_2H_4OH$, —$C_2H_4OCH_3$, —$C_2H_4COCH_3$, —$C_4H_8COCH_3$, —$C_2H_4COCH_3$, —$C_2H_4OCOCH_3$, —$C_3H_6OCOCH_3$, —$C_4H_8OCOCH_3$, —$C_2H_4OCOphenyl$, —$C_2H_4OCOphenyl (SO_2F)$, —$C_2H_4COOC_2H_4OCH_3$, —$C_2H_4OC_2H_4COOC_2H_4OCH_3$, allyl, —$C_2H_4Ophenyl$, —$C_2H_4O$(fluorosulphonylphenyl), —$CH_2CH(CN)(OC_2H_4)$, $C_{1-6}$-alkylphenyl$SO_2F$,

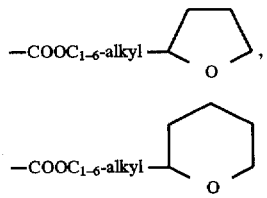

—$COOC_{1-6}$-alkyl$OCOC_{1-6}$-alkyl or —$COOC_{1-6}$-alkyl$COOC_{1-6}$-alkyl $R^3$ is —H, —$OCH_3$ or —Cl;

$R^4$ is —H, —$CH_3$, —$NHCOCH_3$, —$NHCOC_2H_5$, —$NHCOCH(CH_3)_2$, —$NHCOC_3H_6Cl$, —NHCOC$(CH_3)_3$, —$OCH_3$, —$OC_4H_9$, —F, —Cl, —Br, —I or —$NHSO_2C_{1-6}$-alkyl;

$R^5$ is —H , —$OCH_3$, —$OC_2H_5$ or —Cl;

$R^6$ is —H, —$CH_3$, —$OCH_3$, —F, —Cl, Br, —I or —$NHSO_2C_{1-6}$-alkyl;

$R^{10}$ is —H, —$OCH_3$, —$NO_2$, —Cl, —Br or —CN;

$R^{11}$ is —H;

$R^{12}$ is —$SO_2F$ or —$NO_2$;

$R^{13}$ is —H, —$OCH_3$, —$SO_2F$, —Cl, —Br or —$NO_2$; and $R^{14}$ is —H, —$OCH_3$, —Cl, —Br or —CN, provided that at least one of $R^3$ or $R^5$ is —H and that at least one of $R^4$ or $R^6$ is —H.

More preferably compounds of Formula (4) are those in which $R^1$ and $R^2$ each independently is —$C_2H_5$, —$C_4H_9$, —CH(CH₃)CH₂CH₃, —C₂H₄OCOCH₃, —C₄H₈OCOCH₃, —C₂H₄OCOphenyl, —CH₂phenyl, C$_{1-6}$-alkylphenylSO₂F, C$_{1-6}$-alkylOphenylSO₂F,

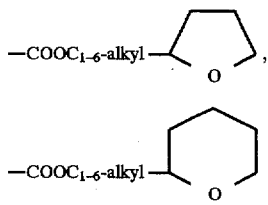

—COOC$_{1-6}$-alkylOCOC$_{1-6}$-alkyl or —COOC$_{1-6}$-alkylCOOC$_{1-6}$-alkyl

R⁴ is —H, —CH₃ or —NHCOCH₃;
R³, R⁵, R⁶ and R¹¹ is —H;
R¹⁰ and R¹³ each independently is —H, —Cl, —Br or —NO₂;
R¹² is —SO₂F; and
R¹⁴ is —H, —Cl or —Br.

An especially preferred compound of Formula (4) is that in which R¹ is —C₂H₅; R² is —C₂H₄OCOphenyl; R⁴ is —CH₃; R¹⁰ and R¹³ are both —Cl; R¹² is —SO₂F; and R³, R⁵, R⁶, R¹¹ and R¹⁴ are all —H.

An especially preferred sub-group of compounds of Formula (1) are those of Formula (7):

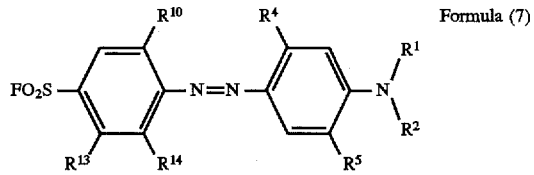

Formula (7)

in which
R¹ and R² each independently is optionally substituted C$_{1-6}$-alkyl;
R⁴ is alkyl or a group of Formula R¹⁹—N—Y—X—W in which Y is a direct link or C=O, X is a direct link, alkyl, alkenyl, aryl, heterocyclic, alkylOalkyl, —NR²⁰—Z—, —COOZ or —O—Z in which Z is alkyl, alkenyl, aryl, heterocyclic, alkylOalkyl or a direct link and R²⁰ is —H, alkyl, aryl or alkylaryl, W is —CO₂R²¹, —OCOR²¹ or —OH in which R²¹ is alkyl, aryl, alkylaryl, alkylOalkyl or alkylOH, and R¹⁹ is —H or alkyl;
R⁵ is —H, C$_{1-6}$-alkoxy or —Ophenyl;
R¹⁰ is —NO₂ or —Cl; and
R¹³ and R¹⁴ each independently is —H or —Cl.

The dyes of Formula (7) are novel and form a further feature of the present invention.

In the dyes of Formula (7)
R¹ and R² each independently is preferably C$_{1-6}$-alkyl or C$_{1-6}$-alkyl substituted by phenyl or —COOC$_{1-6}$-alkyl, and more preferably is ethyl, propyl, butyl, 1-methylpropyl, hexyl, benzyl, ethylphenyl or propylphenyl.
R⁴ is preferably a group of Formula R¹⁹—N—Y—X—W in which
R¹⁹ is preferably —H or C$_{1-6}$-alkyl more preferably —H; Y is preferably a direct link or C=O more preferably C=O;
X is preferably a direct link, C$_{1-8}$-alkyl, C$_{2-8}$-alkenyl, any of the carbocyclic or heterocyclic groups defined above for A, C$_{1-6}$-alkylOC$_{1-6}$-alkyl, —NR²⁰—Z—, —COOZ or —O—Z— in which R²⁰ is preferably —H, C$_{1-6}$-alkyl, phenyl or benzyl and Z is preferably a direct link or C$_{1-6}$-alkyl, C$_{2-8}$-alkenyl, phenyl, benzyl or any of the heterocyclic groups defined above for A;
X is more preferably a direct link, CH₂, C₂H₄, CH₂C(CH₃)₂, cyclohexyl, CH=CH, phenyl, —NR²⁰—Z, —COOZ or —O—Z— in which
R²⁰ is preferably —H, Z is preferably a direct link, C$_{1-6}$alkyl or benzyl.
W is —CO₂$^{R21}$, —OCOR²¹ or —OH in which R²¹ is C$_{1-6}$-alkyl, phenyl, chlorobenzyl, C$_{1-6}$-alkoxybenzyl, benzyl, C$_{1-6}$-alkylOC$_{1-6}$-alkyl or C$_{1-6}$-alkylOH more preferably ethyl, methyl, butyl, or 1,3-dimethylbutyl.

Dyes in which both A and D are phenyl and in which one of A and D carries a 4-SO₂F group are generally more stable and build up better on polyester textile material than do the corresponding 2-SO₂F dyes.

A further preferred sub-group of compounds of Formula (1) are those of Formula (5);

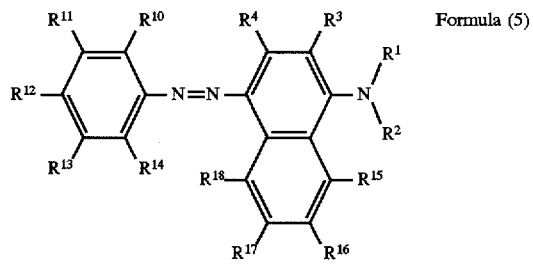

Formula (5)

wherein
R¹ to R⁴ and R¹⁰ to R¹⁴ are as herein before defined; and R¹⁵ to R¹⁸ each independently is —H, —F, —Cl, —Br, —I, —SO₂F, —NO₂, —CN, —NR₁R₂, OH or optionally substituted —C$_{1-6}$-alkyl or —C$_{1-6}$-alkoxy.

The optional substituents for any of the groups represented by R¹⁵ to R¹⁸ may be selected from any of optional substituents described above for A, D, R¹ and R².

Compositions comprising dispersions of the compounds which are free from water solubilising groups of Formula (1) in which A is an optionally substituted heterocyclic or carbocyclic group; and D is an optionally substituted carbocyclic group; and at least one of A or D carries directly at least one —SO₂F group or carried a substituent to which at least one —SO₂F group is attached in aqueous media are novel and form a further feature of the present invention provided that one of A or D is not 3,5-difluorosulphonylthien-2-yl, 4-fluorosulphonylnaphth-1-yl, optionally substituted 1-phenylpyrazol-4-yl-5-one or

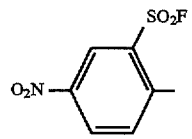

or that one of A or D does not carry an —NCH₂CH(OH)CH₂Cl, —NCOCH₂Cl or —NCH₂CH₂SO₂F substituent except for
4-(5-fluorosulphonyl-2-methylphenylazo)-N,N-di(2-hydroxyethyl)aniline,
4-(5-fluorosulphonyl-2-methylphenylazo)-N-(2-hydroxyethyl)aniline,
4-(5-fluorosulphonyl-2-methylphenylazo)-N,N-diethylaniline,
4-(5-fluorosulphonyl-2-methylphenylazo)-N,N-di(2-hydroxyethyl)-3-methylaniline,
4-(5-fluorosulphonyl-2-chlorophenylazo)-N,N-di(2-hydroxyethyl)aniline, 4-(3-fluorosulphonylphenylazo)-N,N-di(2-hydroxyethyl)-3-methylaniline,
4-(4-fluorosulphonylphenylazo)-N,N-di(2-hydroxyethyl)aniline,
4-(5-fluorosulphonyl-2-methoxyphenylazo)-N,N-di(2-hydroxyethyl)aniline,
4-(5-fluorosulphonyl-2-methylphenylazo)-N-ethyl-N-(((2-methoxy)-2-ethoxy)ethyl)aniline,
4-(5-fluorosulphonyl-2-chlorophenylazo)-N-ethyl-N(((2-methoxy)-2-ethoxy)ethyl)aniline,
4-(3-fluorosulphonylphenylazo)-N-ethyl-N(((2-methoxy)-2-ethoxy)ethyl)aniline,
4-(4-fluorosulphonylphenylazo)-N-ethyl-N(((2-methoxy)-2-ethoxy)ethyl)aniline,
4-(5-fluorosulphonyl-2-methoxyphenylazo)-N-ethyl-N(((2-methoxy)-2-ethoxy)ethyl)aniline,
4-(5-fluorosulphonyl-2-methylphenylazonaphth-1-ylamine,
4-(5-fluorosulphonyl-2-methylphenylazo)-2-ethoxyaniline,
4-(3-fluorosulphonyl(phenylazo)-3,6-dimethoxyaniline Compositions comprising dispersions of compounds of Formulae (2), (3), (4), (5) and (7) are also novel. The compositions typically comprise form 1% to 30% of a compound of Formulae (1), (2), (3), (4), (5) or (6) in an aqueous medium. The compositions are preferably buffered at pH 2 to 7 more preferably at pH 4 to 6.

These dispersions may further comprise ingredients conventionally used in dyeing applications such as dispersing agents for example lignosulphonates, naphthalene sulphonic acid/formaldehyde condensates or phenol/cresol/sulphanilic acid/formaldehyde condensates, surfactants, wetting agents such as alkyl aryl ethoxylates which may be sulphonated or phosphated, inorganic salts, de-foamers such as mineral oil or nonanol, organic liquids and buffers. Dispersing agents may be present am from 10% to 200% on the weight of the compound of Formulae (1), (2), (3), (4), (5) or (7). Wetting agents may be used at from 0% to 20% on the weight of the compound (1), (2), (3), (4), (5) or (7). The dispersions may be prepared by bead milling the compound of Formula (1), (2), (3 , (4), (5) or (7) with glass beads or sand in an aqueous medium.

According to a further feature of the present invention there is provided a process for the mass coloration of plastics which comprises incorporating into a plastics material a compound or mixture thereof which is free from water solubilising groups, of Formula (1) wherein A and D each independently is an optionally substituted heterocyclic or carbocyclic group and at least one of A or D carries directly at least one —$SO_2F$ group or carries a substituent to which at least one —$SO_2F$ group is attached provided that one of A or D is not 4-fluorosulphonylnaphth-1-yl, except for 4-(2-chloro-4-nitrophenylazo)-2-methyl-4-fluorosulphonylaniline, 4-(5-fluorosulphonyl-2-methylphenylazo)-N,N-di(2-hydroxyethyl)aniline,
4-(5-fluorosulphonyl-2-methylphenylazo)-N-(2-hydroxyethyl)aniline,
4-(5-fluorosulphonyl-2-methylphenylazo)-N,N-diethylaniline,
4-(5-fluorosulphonyl-2-methylphenylazo)-N,N-di(2-hydroxyethyl)-3-methylaniline,
4-(5-fluorosulphonyl-2-chlorophenylazo)-N,N-di(2-hydroxyethyl)aniline,
4-(3-fluorosulphonylphenylazo)-N,N-di(2-hydroxyethyl)-3-methylaniline,
4-(4-fluorosulphonylphenylazo)-N,N-di(2-hydroxyethyl)aniline,
4-(5-fluorosulphonyl-2-methoxyphenylazo)-N,N-di(2-hydroxyethyl)aniline,
4-(5-fluorosulphonyl-2-methylphenylazo)-N-ethyl-N-(((2-methoxy)-2-ethoxy)ethyl)aniline,
4-(5-fluorosulphonyl-2-chlorophenylazo)-N-ethyl-N(((2-methoxy)-2-ethoxy)ethyl)aniline,
4-(3-fluorosulphonylphenylazo)-N-ethyl-N(((2-methoxy)-2-ethoxy)ethyl)aniline,
4-(4-fluorosulphonylphenylazo)-N-ethyl-N(((2-methoxy)-2-ethoxy)ethyl)aniline,
4-(5-fluorosulphonyl-2-methoxyphenylazo)-N-ethyl-N(((2-methoxy)-2-ethoxy)ethyl)aniline,
4-(5-fluorosulphonyl-2-methylphenylazonaphth-1-ylamine,
4-(5-fluorosulphonyl-2-methylphenylazo)-2-ethoxyaniline,
4-(3-fluorosulphonyl(phenylazo)-3,6-dimethoxyaniline, According to a further feature of the present invention there is provided a process for the mass coloration of plastics which comprises incorporating into a plastics material a compound or mixture thereof which is free from water solubilising groups, of Formula (1) wherein A and D each independently is an optionally substituted heterocyclic or carbocyclic group and at least one of A or D carries directly at least one —$SO_2F$ group or carries a substituent to which at least one —$SO_2F$ group is attached and at least one of A or D carries directly at least one ester group or carries a substituent to which at least one ester group is attached.

The plastics may be selected from polystyrene, acrylics, styrene/acrylonitrile mixtures, acrylonitrile/butadiene/styrene mixtures, polycarbonate, polyether-sulphone, nylons, rigid PVC (uPVC) and polypropylene.

The compound may be incorporated by blending with granules or powdered plastics material by, for example, dry tumbling or high-speed mixing followed by injection moulding on a screw machine or by conventional compounding/masterbatching techniques. The present dyes generally dissolve or disperse readily in hot plastics melt and provide bright coloration generally with good clarity and good light fastness.

The plastics materials when coloured with the above dyes form a further feature of the present invention.

The compounds of Formula (1) may be obtained by usual methods for the preparation of azo compounds such as by diazotisation of an amine of Formula A—$NH_2$ or $A^1$—$NH_2$ and coupling onto a component D—X or $D^1$—X in which A, $A^1$, D and $D^1$ are as hereinbefore defined and X is a group displaceable by a diazotised amine. Typically the amine, A—$NH_2$ or $A^1$—$NH_2$ may be diazotised in an acidic medium, such as acetic, propionic or hydrochloric acid using a nitrosating agent such as nitrosylsulphuric acid, sodium nitrite or methylnitrite at a temperature from −10° C. to 10° C. Coupling onto the component D—X or $D^1$—X may be achieved by adding the diazotised amine to a mixture of D—X or $D^1$—X in an alkanol such as methanol at a temperature from 0° C. to 10° C. After coupling the compound of Formula (1) may be recovered from the reaction mixture by any convenient means such as by filtration.

Fluorosulphonyl groups may be introduced into the compounds of Formula (1) or Formula (2) or into the A, $A^1$, D and $D^1$ components prior to coupling by methods generally available in the literature. For example reaction of the compound of Formula (1) or Formula (2), A—$NH_2$, $A^1$—$NH_2$, the $NH_2$ being protected as necessary, D—X or $D^1$—X, in which A, $A^1$, D and $D^1$ are as hereinbefore defined, with chlorosulphonic acid optionally in the presence of dimethylformamide and thionylchloride at a temperature of from 30° C. to 140° C. gives the chlorosulphonyl derivative. The chlorosulphonyl derivative may be reacted in boiling aqueous media with potassium fluoride to give the fluorosulphonyl derivative.

Alternatively the compound of Formula (1) or Formula (2), A—NH$_2$, A$^1$—NH$_2$, D—X or D$^1$—X may be sulphonated with sulphuric acid or oleum to give the sulphonic acid derivative which may be converted to the chlorosulphonyl derivative by reaction, either of the free acid or an inorganic salt thereof, with thionylchloride optionally in the presence of a chlorophosphorus compound such as phosphorus oxychloride or phosphorus pentachloride in an organic liquid such as an aromatic hydrocarbon at a temperature of from 20° C. to 110° C. Similarly a sulphonate ester may be converted to the corresponding chlorosulphonyl derivative. The chlorosulphonyl derivative may then be converted to the fluorosulphonyl derivative as described above.

The compounds of Formulae (1), (2), (3), (4), (5) and (7) are useful for the coloration of synthetic textile materials particularly polyester textile materials and fibre blends thereof to which they impart colours which have excellent wet and light fastness properties.

The compounds of Formula (1), (2), (3), (4), (5) or (7) are also useful for the mass coloration of plastics as described above and impart bright colours generally with good clarity and light fastness.

The invention is further illustrated by the following Examples.

EXAMPLE 1

Preparation of 4-(2,5-dichloro-4-fluorosulphonylphenylazo)-3-methyl-N-ethyl-N-(2-benzoyloxymethyl)aniline i) Preparation of 2,5-dichloro-4-chlorosulphonylaniline 2,5-Dichloroaniline (32.4 parts) was added portionwise to chlorosulphonic acid (93 parts) at 35° C. The mixture was stirred at 120° C. for 3 hrs and then cooled to 70° C. Dimethyl formamide (1.6 parts) and thionyl chloride (15 parts) were added, maintaining the temperature at 65°–70° C. and the mixture stirred at 70° C. for 24 hours. The reaction mixture was cooled to ambient temperature and poured with caution onto stirred ice (1000 parts) producing a cream precipitate. The product was isolated by filtration, washed acid-free with ice/water and dried under vacuum to yield; 2,5-dichloro-4-chlorosulphonylaniline (44.2 parts).

ii) Preparation of 2,5-dichloro-4-fluorosulphonylaniline

A mixture of 2,5-dichloro-4-chlorosulphonylaniline (44.2 parts), potassium fluoride (38 parts) and water (100 parts) was stirred under reflux for 5 hours. The reaction mixture was cooled to ambient temperature and drowned into water (300 parts). The cream precipitate was isolated by filtration, washed with water and dried under vacuum to yield; 2,5-dichloro-4-fluorosulphonylaniline (37.2 parts).

iii) Preparation of 3-methyl-N-ethyl-N-(2-benzoyloxyethyl)aniline

Benzoylchloride (3.3 g) was added to a mixture of N-ethyl-N-hydroxyethyl-3-methylaniline (2.1 g) in acetone (25 cm$^3$) and pyridine (1 cm$^3$) and stirred at reflux for 1 hour. The reaction mixture was cooled and used directly in iv) below.

iv) Preparation of 4-(2,5-dichloro-4-fluorosulphonylphenylazo)-3-methyl-N-ethyl-N-(2-benzoyloxyethyl)aniline Nitrosyl sulphuric acid (3 cm$^3$ of 40%) was added to a mixture of 2,5-dichloro-4-fluorosulphonylaniline (2 g) in acetic/propionic acid (86:14, 25 cm$^3$) at 0° C. to 5° C. The mixture was stirred at 0° C. to 5° C. for 2 hours before adding the reaction mixture from iii) above in methanol (100 cm$^3$) at 0° C. to 5° C. The precipitated solid was collected by filtration, washed with water, slurried with methanol, collected by filtration and washed with methanol to give 4-(2,5-dichloro-4-fluorosulphonylphenylazo)-3-methyl-N-ethyl-N-(2-benzoyloxyethyl)aniline (2.1 g) when applied to polyester materials from aqueous dispersion gives bluish-red shades with excellent wet and light fastness properties.

The following examples of dyes of Formula:

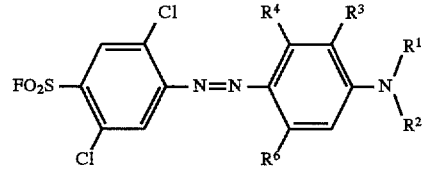

were prepared by the procedure of Example 1:

| Ex | R$^1$ | R$^2$ | R$^4$ | R$^3$ | R$^6$ | λmax/nm |
|---|---|---|---|---|---|---|
| 2 | —C$_2$H$_5$ | —C$_2$H$_4$OH | —NHCOCH$_3$ | —H | —H | 522 |
| 3 | —C$_2$H$_5$ | —C$_2$H$_4$OCOCH$_3$ | —NHCOCH$_3$ | —H | —H | 518 |
| 4 | —CH$_2$CH=CH$_2$ | —CH$_2$CH=CH$_2$ | —NHCOCH$_3$ | —H | —H | 520 |
| 5 | —C$_4$H$_8$OCOCH$_3$ | —C$_4$H$_8$OCOCH$_3$ | —NHCOCH$_3$ | —H | —H | 535 |
| 6 | —C$_2$H$_4$OCOCH$_3$ | —C$_2$H$_4$OCOCH$_3$ | —NHCOCH$_3$ | —H | —H | 504 |
| 7 | —C$_2$H$_4$COOCH$_3$ | —C$_2$H$_4$COOCH$_3$ | —NHCOCH$_3$ | —H | —H | 509 |
| 8 | —C$_4$H$_9$ | —C$_2$H$_4$COOCH$_3$ | —NHCOCH$_3$ | —H | —H | 528 |
| 9 | —C$_4$H$_9$ | —C$_2$H$_4$COOC$_2$H$_4$OCH$_3$ | —NHCOCH$_3$ | —H | —H | 530 |
| 10 | —C$_2$H$_4$COOCH$_3$ | —C$_4$H$_8$OCOCH$_3$ | —NHCOCH$_3$ | —H | —H | 526 |
| 11 | —C$_2$H$_4$OH | —C$_2$H$_4$OH | —CH$_3$ | —H | —H | 508 |
| 12 | —C$_2$H$_4$OCOCH$_3$ | —C$_2$H$_4$OCOCH$_3$ | —H | —OCH$_3$ | —H | 518 |
| 13 | —C$_2$H$_4$CN | —H | —H | —OCH$_3$ | —CH$_3$ | 504 |
| 14 | —C$_2$H$_4$CN | —H | —CH$_3$ | —H | —H | 464 |
| 15 | —C$_2$H$_4$CN | —H | —H | —Cl | —H | 440 |
| 16 | —C$_2$H$_4$OCOCH$_3$ | —C$_2$H$_4$OCOCH$_3$ | —Cl | —H | —H | 470 |
| 17 | —C$_4$H$_8$OCOCH$_3$ | —C$_4$H$_8$OCOCH$_3$ | —CH$_3$ | —H | —CH$_3$ | 512 |
| 18 | —C$_2$H$_4$CN | —C$_2$H$_4$CN | —CH$_3$ | —H | —CH$_3$ | 465 |
| 19 | —C$_2$H$_4$CN | —C$_2$H$_4$COOCH$_3$ | —H | —H | —H | 460 |
| 20 | —C$_2$H$_5$ | —C$_4$H$_8$OCOCH$_3$ | —CH$_3$ | —H | —H | 530 |
| 21 | —C$_4$H$_8$OCOCH$_3$ | —C$_4$H$_8$OCOCH$_3$ | —CH$_3$ | —H | —H | 502 |
| 22 | —C$_2$H$_4$OCOCH$_3$ | —C$_2$H$_4$OCOC$_2$H$_5$ | —H | —OCH$_3$ | —NHCOCH$_3$ | 548 |
| 23 | —C$_2$H$_5$ | —C$_2$H$_4$OH | —CH$_3$ | —H | —H | 520 |
| 24 | —C$_2$H$_5$ | —C$_4$H$_8$OH | —CH$_3$ | —H | —H | 530 |
| 25 | —C$_2$H$_5$ | —CH$_2$CH(CH)C$_2$H$_5$ | —CH$_3$ | —H | —H | 532 |

-continued

| Ex | R$^1$ | R$^2$ | R$^4$ | R$^3$ | R$^6$ | λmax/nm |
|----|-------|-------|-------|-------|-------|---------|
| 26 | —C$_2$H$_5$ | —C$_2$H$_5$ | —H | —OCH$_3$ | —CH$_3$ | 548 |
| 27 | —C$_2$H$_5$ | —CH$_2$C(OH) (OC$_2$H$_5$) | —CH$_3$ | —H | —H | 525 |
| 28 | —C$_2$H$_5$ | —CH$_2$C(OH) (CN) | —CH$_3$ | —H | —H | 523 |
| 29 | —C$_5$H$_{11}$ | —C$_2$H$_4$OH | —CH$_3$ | —H | —H | 529 |
| 30 | —C$_2$H$_4$OCH$_3$ | —C$_2$H$_4$OCH$_3$ | —CH$_3$ | —H | —H | 520 |
| 31 | —C$_4$H$_9$ | —C$_2$H$_4$OH | —CH$_3$ | —H | —H | 528 |
| 32 | —C$_6$H$_{13}$ | —C$_2$H$_4$OH | —CH$_3$ | —H | —H | 531 |
| 33 | —C$_2$H$_4$Ophenyl | —C$_2$H$_4$OH | —CH$_3$ | —H | —H | 520 |
| 34 | —CH$_2$C(CN) (OC$_2$H$_5$) | —CH$_2$C(CN) (OC$_2$H$_5$) | —CH$_3$ | —H | —H | 517 |
| 35 | —C$_2$H$_5$ | —C$_2$H$_4$OC$_2$H$_4$COOC$_2$H$_4$OCH$_3$ | —CH$_3$ | —H | —H | 525 |
| 36 | —CH$_3$ | —CH$_3$ | —H | —H | —H | 515 |
| 37 | —C$_2$H$_5$ | —C$_2$H$_5$ | —H | —H | —H | 520 |
| 38 | —C$_3$H$_7$ | —C$_3$H$_7$ | —H | —H | —H | 522 |
| 39 | —C$_4$H$_9$ | —C$_4$H$_9$ | —H | —H | —H | 527 |
| 40 | —C$_2$H$_5$ | —C$_2$H$_5$ | —NHCOCH$_3$ | —H | —H | 536 |
| 41 | —C$_2$H$_5$ | —C$_2$H$_4$OCOphenyl | —CH$_3$ | —H | —H | 514 |
| 42 | —C$_2$H$_5$ | —C$_2$H$_4$COOC$_2$H$_5$ | —CH$_3$ | —H | —H | 514 |
| 43 | —C$_2$H$_5$ | —C$_2$H$_4$COOC$_2$H$_4$OCH$_3$ | —CH$_3$ | —H | —H | 513 |
| 44 | —C$_2$H$_5$ | —C$_2$H$_4$COOC$_2$H$_4$OC$_4$H$_9$ | —CH$_3$ | —H | —H | 513 |
| 45 | —C$_2$H$_5$ | —C$_2$H$_4$COOCH$_2$tetrahydrofuran-2-yl | —CH$_3$ | —H | —H | 512 |
| 46 | —C$_2$H$_5$ | —C$_2$H$_4$COOC$_2$H$_4$Ophenyl | —CH$_3$ | —H | —H | 512 |
| 47 | —C$_2$H$_5$ | —C$_2$H$_4$COOCH$_2$COOC$_2$H$_5$ | —CH$_3$ | —H | —H | 511 |
| 48 | —C$_2$H$_5$ | —C$_2$H$_4$COOC$_2$H$_4$OC$_2$H$_4$OCH$_3$ | —CH$_3$ | —H | —H | 513 |
| 49 | —C$_2$H$_5$ | —C$_2$H$_4$COOC$_2$H$_4$OC$_2$H$_4$OC$_2$H$_5$ | —CH$_3$ | —H | —H | 513 |
| 50 | —C$_2$H$_5$ | —C$_2$H$_4$COOC$_2$H$_4$OC$_2$H$_5$ | —CH$_3$ | —H | —H | 512 |
| 51 | —C$_2$H$_5$ | —C$_2$H$_4$COOCH(CH$_3$)$_2$ | —CH$_3$ | —H | —H | 513 |
| 52 | —C$_2$H$_5$ | —C$_2$H$_4$COOC$_2$H$_4$OH | —CH$_3$ | —H | —H | 514 |
| 53 | —C$_2$H$_5$ | —C$_2$H$_4$COOCH$_2$tetrahydropyran-2-yl | —CH$_3$ | —H | —H | 512 |
| 54 | —C$_2$H$_5$ | —C$_2$H$_4$COOCH$_3$phenyl | —CH$_3$ | —H | —H | 513 |
| 55 | —C$_2$H$_5$ | —C$_2$H$_4$COOC$_3$H$_6$COOC$_2$H$_5$ | —CH$_3$ | —H | —H | 514 |
| 56 | —C$_2$H$_5$ | —C$_2$H$_4$COOCH(C$_2$H$_5$)COOC$_2$H$_5$ | —CH$_3$ | —H | —H | 514 |
| 57 | —C$_2$H$_5$ | —C$_2$H$_4$COOC$_4$H$_8$OH | —CH$_3$ | —H | —H | 514 |
| 58 | —C$_2$H$_5$ | —C$_2$H$_4$COOC$_4$H$_8$OCOCH$_3$ | —CH$_3$ | —H | —H | 513 |
| 59 | —C$_2$H$_5$ | —C$_2$H$_4$COOCH$_2$COOCH$_3$ | —CH$_3$ | —H | —H | 511 |
| 60 | —C$_2$H$_4$OH | —C$_2$H$_4$COOCH$_2$tetrahydrofuran-2-yl | —CH$_3$ | —H | —H | 511 |
| 61 | —C$_2$H$_4$OH | —C$_2$H$_4$COOCH$_2$COOC$_2$H$_5$ | —CH$_3$ | —H | —H | 510 |
| 62 | —C$_2$H$_5$ | —C$_2$H$_4$COOCH$_2$CN | —CH$_3$ | —H | —H | 512 |
| 63 | —C$_2$H$_5$ | —C$_2$H$_4$COOC$_2$H$_4$CN | —CH$_3$ | —H | —H | 514 |
| 64 | —C$_2$H$_5$ | —C$_2$H$_4$COOCH$_2$COCH$_3$ | —CH$_3$ | —H | —H | 513 |
| 65 | —C$_2$H$_5$ | —C$_2$H$_4$OCOC(CH$_3$)$_3$ | —CH$_3$ | —H | —H | 511 |
| 66 | —C$_2$H$_5$ | —C$_2$H$_4$OCO(CH$_2$)$_3$CH$_3$ | —CH$_3$ | —H | —H | 510 |
| 67 | —C$_2$H$_5$ | —C$_2$H$_4$OCOCH(CH$_3$)$_2$ | —CH$_3$ | —H | —H | 510 |
| 68 | —C$_2$H$_5$ | —C$_2$H$_4$OCO(CH$_2$)$_3$Cl | —CH$_3$ | —H | —H | 507 |
| 69 | —C$_2$H$_5$ | —C$_2$H$_4$OCO(4-NO$_2$phenyl) | —CH$_3$ | —H | —H | 503 |
| 70 | —C$_2$H$_5$ | —C$_2$H$_4$OCO(4-CH$_3$phenyl) | —CH$_3$ | —H | —H | 511 |
| 71 | —C$_2$H$_5$ | —C$_2$H$_4$OCO(3-CH$_3$phenyl) | —CH$_3$ | —H | —H | 511 |
| 72 | —C$_2$H$_5$ | —C$_2$H$_4$O(4-OCH$_3$phenyl) | —CH$_3$ | —H | —H | 512 |
| 73 | —C$_2$H$_5$ | —C$_2$H$_4$O(2-OCH$_3$phenyl) | —CH$_3$ | —H | —H | 509 |
| 74 | —C$_2$H$_5$ | —C$_2$H$_4$OC$_2$H$_4$COOC$_2$H$_5$ | —CH$_3$ | —H | —H | 521 |
| 75 | —C$_2$H$_5$ | —C$_2$H$_4$OC$_2$H$_4$COOCH$_3$ | —CH$_3$ | —H | —H | 521 |
| 76 | —C$_2$H$_5$ | —C$_2$H$_4$OC$_2$H$_4$COOCH$_2$COOC$_2$H$_5$ | —CH$_3$ | —H | —H | 521 |
| 77 | —C$_2$H$_5$ | —C$_2$H$_4$OCOC$_2$H$_4$COOC$_2$H$_5$ | —CH$_3$ | —H | —H | 511 |
| 78 | —C$_2$H$_5$ | —C$_2$H$_4$OCOCH$_2$Ophenyl | —CH$_3$ | —H | —H | 515 |
| 79 | —C$_2$H$_4$OH | —C$_2$H$_4$OCOphenyl | —CH$_3$ | —H | —H | 517 |
| 80 | —C$_2$H$_4$COOC$_3$H$_7$ | —C$_2$H$_4$COOC$_3$H$_7$ | —NHCOCH$_3$ | —H | —H | 498 |
| 81 | —C$_2$H$_5$ | —C$_3$H$_6$COOC$_2$H$_5$ | —CH$_3$ | —H | —H | 523 |
| 82 | -cyclohexyl | —CH$_2$phenyl | —H | —H | —H | 509 |
| 83 | —C$_4$H$_9$ | —CH(CH$_3$)$_2$ | —NHCOCH$_3$ | —H | —H | 539 |
| 84 | —C$_2$H$_5$ | —C$_4$H$_9$ | —NHCOCH$_3$ | —H | —H | 539 |
| 85 | —C$_2$H$_5$ | —C$_2$H$_4$OC$_2$H$_4$COOC$_2$H$_4$OCH$_3$ | —CH$_3$ | —H | —H | 525 |
| 86 | —C$_2$H$_4$OH | —C$_2$H$_4$Ophenyl | —CH$_3$ | —H | —H | 520 |

EXAMPLE 87

Preparation of 4-(2,6-dibromo-4-fluorosulphonylphenylazo)-3-acetamido-N-N-diethylaniline i) Preparation of 2,6-dibromo-4-fluorosulphonylaniline To a solution of 4-aminobenzenesulphonyl fluoride (10 parts) in acetic acid (100 parts), stirring at 0°–5° C., was added gradually a solution of bromine (18 parts) in acetic acid (50 parts); keeping the temperature below 5° C. The temperature was allowed to warm to ambient and the mixture was stirred at this temperature for a further 1 hr. The reaction mass was drowned into water (500 parts), the product was isolated by filtration, washed with cold water and dried at 50° C. to yield; 2,6-dibromo-4-fluorosulphonylaniline (17.5 parts).

ii) Preparation of 4-(2,6-dibromo-4-fluorosulphonylphenylazo)-3-acetamido-N-N-diethylaniline A mixture of 2,6-dibromo-4-fluorosulphonylaniline (2.7 parts) and acetic/propionic acid mixture (15 parts, 86/14 vol/vol) was stirred and heated until a complete solution was formed. The solution was set stirring at 0°–5° C., and nitrosyl sulphuric acid soln (5 parts) was added dropwise. The mixture was stirred at this temperature for a further 30 min.

The diazo solution was added slowly to a mixture of 3-N,N-diethylaminoacetanilide (1.7 parts), methanol (50 parts) and sulphamic acid (0.5 parts); stirring at 0°–5° C. After stirring for 1 hr at this temperature, water (50 parts) was added and the mixture was stirred a further 30 min at ambient temperature. The product was isolated by filtration, washed with water and methanol and then dried at 50° C. to yield; 4-(2,6-dibromo-4-fluorosulphonylphenylazo)-3-acetamido-N,N-diethylaniline (1.8 parts) λmax=480 nm.

When applied to polyester materials from an aqueous dispersion, the dye gives dull orange shades with excellent light fastness and excellent fastness to wet treatments. The following examples of dyes of Formula:

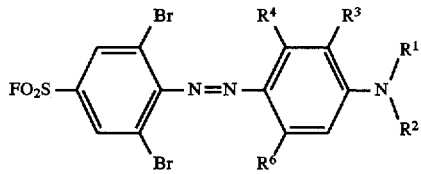

were prepared by the procedure of Example 87

| Ex. | $R^1$ | $R^2$ | $R^4$ | $R^3$ | $R^6$ | λmax/nm |
|---|---|---|---|---|---|---|
| 88 | —$C_2H_4OH$ | —$C_2H_4OC_2H_5$ | —H | —H | —H | 434 |
| 89 | —$C_2H_4OCH_3$ | —$C_2H_4OCH_3$ | —$CH_3$ | —H | —H | 447 |
| 90 | —$C_2H_4CN$ | —$C_2H_4CN$ | —$CH_3$ | —H | —H | 418 |
| 91 | —$C_2H_5$ | —$C_2H_4CN$ | —$CH_3$ | —H | —H | 435 |
| 92 | —H | —$C_2H_4CN$ | —H | —H | —H | 399 |
| 93 | —$C_2H_5$ | —$C_2H_4CN$ | —H | —H | —H | 421 |
| 94 | —$C_2H_4OH$ | —$C_2H_4CN$ | —H | —H | —H | 420 |
| 95 | —$C_2H_4CN$ | —$C_2H_4CN$ | —H | —H | —H | 406 |
| 96 | —$C_2H_5$ | —$C_2H_5$ | —H | —H | —H | 438 |
| 97 | —$C_2H_5$ | —$C_2H_5$ | —$CH_3$ | —H | —H | 453 |
| 98 | —$C_2H_4OH$ | —$C_2H_4OH$ | —$CH_3$ | —H | —H | 454 |
| 99 | —$C_4H_9$ | —$C_4H_9$ | —H | —H | —H | 442 |
| 100 | —$C_2H_5$ | —$CH_2$phenyl | —H | —H | —H | 431 |
| 101 | —$C_2H_5$ | —$C_2H_5$ | —$NHCOCH_3$ | —H | —H | 486 |
| 102 | —$C_4H_9$ | —$C_4H_9$ | —$NHCOCH_3$ | —H | —H | 486 |
| 103 | —$C_4H_8OCOCH_3$ | —$C_4H_9OCOCH_3$ | —$NHCOCH_3$ | —H | —H | 479 |

EXAMPLE 104

Preparation of 4-(2,6-dicyano-4-fluorosulphonyphenylazo)-3-acetamido-N-N-diethylaniline A mixture of 4-(2,6-dibromo-4-fluorosulphonylphenyllazo-3-acetamido-N,N-diethylaniline (Example 101) (1.5 parts), cuprous cyanide (0.54 parts) and dimethylformamide (20 parts) was stirred at ambient temperature for 3 hr. The reaction mixture was diluted with water (40 parts), stirred for 30 min and the product was isolated by filtration to yield; 4-(2,6-dicyano-4-fluorosulphonylphenylazo)-3-acetamido-N,N-diethylaniline (0.8 parts) λmax=611 nm.

When applied to polyester materials from an aqueous dispersion, the dye gives bright blue shades with excellent light fastness and excellent fastness to wet treatments.

EXAMPLE 105

Preparation of 4-(2,6-dicyano-4-fluorosulphonylphenylazo)-3-acetamido-N-N-di-n-butyl aniline The dye in Example 102 (3.09 g) was stirred in DMF (30 cm$^3$) and CuCN (1.0 g) at 90° C. for 2 hours. The reaction mix was drowned onto ice and the precipitate collected, washed with water and dried under suction. The filter cake was dissolved in dichloromethane, filtered and the filtrate evaporated to give a blue dye (λmax 611 nm).

EXAMPLE 106

Preparation of 4-(2,6-dicyano-4-fluorosulphonylphenylazo)-3-acetamido-N-N-diacetoxybutylamino aniline The dye in Example 103 (3.09 g) was stirred in DMF (30 cm$^3$) and CuCN (1.0 g) at 90° C. for 2 hours. The reaction mix was drowned onto ice and the precipitate collected, washed with water and dried under suction. The filter cake was dissolved in dichloromethane, filtered and the filtrate evaporated to give a blue dye (λmax 608 nm).

EXAMPLE 107

Preparation of 4-(2,6-dichloro-4-fluorosulphonylphenylazo)-N-N-di-n-butylaniline
i) Preparation of 2,6-dichloro-4-chlorosulphonylaniline The procedure of Example 1 ii) was repeated except that in place of the 32.4 parts of 2,5-dichloraniline, 32.4 parts of 2,6-dichloroaniline were used, to yield 2,6-dichloro-4-chlorosulphonylaniline (42.6 parts).
ii) Preparation of 2,6-dichloro-4-fluorosulphonylaniline The procedure of Example iii) was repeated except that in place of the 44.2 parts of 2,5-dichloro-4-chlorosulphonylaniline, 42.6 parts of 2,6-dichloro-4-chlorosulphonylaniline were used, to yield 2,6-dichloro-4-fluorosulphonylaniline (36.0 parts).
iii) Preparation of 4-(2,6-dichloro-4-fluorosulphonylphenylazo)-N-N-di-n-butylaniline A mixture of 2,6-dichloro-4-fluorosulphonylaniline (2.0 parts) and acetic/propionic acid mixture (15 parts, 86/14 vol/vol) was stirred and heated until a complete solution was formed. The solution was set stirring at 0°–5° C. and nitrosyl sulphuric acid solution (5 parts) was added slowly. The mixture was stirred at this temperature for a further 30 min. The cooled diazo solution was added slowly to a mixture of N,N-di-n-butylaniline (1.7 parts), methanol (40 parts) and

19 sulphamic acid (0.5 parts); stirring at 0°–5° C. After stirring for 3 hr at this temperature, water (50 parts) was added and the mixture stirred for a further 2 hr at ambient. The product was isolated by filtration, washed with water and methanol and dried to yield; 4-(2,6-dichloro-4-fluorosulphonylphenylazo)-N,N-di-n-butylaniline (3.0 parts) λmax=443 nm. When applied to polyester materials from an aqueous dispersion, the dye gives dull yellow brown shades with excellent fastness to light and wet treatments. The following examples of dyes of Formula:

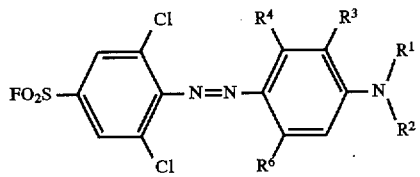

were prepared by the procedure of Example 107

| Example | $R^1$ | $R^2$ | $R^4$ | $R^3$ | $R^6$ | λmax/nm |
|---|---|---|---|---|---|---|
| 108 | —$C_2H_5$ | —$C_2H_5$ | —H | —H | —H | 439 |
| 109 | —$C_2H_5$ | —$C_2H_5$ | —$CH_3$ | —H | —H | 455 |
| 110 | —$C_2H_5$ | —$CH_2$phenyl | —H | —H | —H | 431 |

EXAMPLE 111

Preparation of 4-(2-bromo-4-fluorosulphonylphenylazo)-3-acetamido-N-N-diethylaniline The procedure of Example 87ii) was repeated except that in place of the 2.7 parts of 2,6-dibromo-4-fluorosulphonylaniline; 2.0 parts of 2-bromo-4-fluorosulphonylaniline were used. The product, 4-(2-bromo-4-fluorosulphonylphenylazo)-3-acetamido-N,N-diethylaniline (1.6 parts) λmax=524 nm, when applied to polyester materials from an aqueous dispersion gives bright mid red shades with excellent fastness to light and wet treatments.

EXAMPLE 112

Preparation of 4-(2,5-dimethoxy-4-fluorosulphonylphenylazo)-3-acetamido-N-N-diethylaniline The procedure of Example 87ii) was repeated except that in place of the 2.7 parts of 2,6-dibromo-4-fluorosulphonylaniline; 1.9 parts of 2,5-dimethoxy-4-fluorosulphonylaniline were used. The product, 4-(2,5-dimethoxy-4-fluorosulphonylphenylazo)-3-acetamido-N,N-diethylaniline (1.4 parts) λmax=545 nm, when applied to polyester materials from an aqueous dispersion gives bluish red shades with excellent fastness to light and wet treatments.

EXAMPLE 113

Preparation of 4-(2-nitro-5-chloro-4-fluorosulphonylphenylazo)-3-acetamido-N,N-diethylaniline The procedure of Example 87ii) was repeated except that in place of the 2.7 parts of 2,6-dibromo-4-fluorosulphonylaniline; 2.0 parts of 2-nitro-5-chloro-4-fluorosulphonylaniline were used. The product, 4-(2-nitro-5-chloro-4-fluorosulphonylphenylazo)-3-acetamido-N,N-diethylaniline (2.6 parts) λmax=550 nm, when applied to polyester materials from an aqueous dispersion gives bluish red shades with excellent fastness to light and wet treatments.

EXAMPLE 114 i) Preparation of 2-nitro-4-fluorosulphonylaniline

N-acetyl sulphanilyl chloride (100 g) was dissolved in concentrated sulphuric acid (515 cm³), cooled to 4° C. and a mixture of concentrated nitric acid (38.6 cm³) and concentrated sulphuric acid (42.9 cm³) added dropwise maintaining the temperature at 4°–6° C. After 1 hour the reaction mix was drowned onto ice and the precipitate collected, extracted into dichloromethane and evaporated to a yellow solid (92 g). 31 g of this yellow solid was refluxed for 3 hours in water (20 cm³), p-dioxane (20 cm³) and KF (19.4 g) then drowned onto ice and the precipitate collected. This precipitate was refluxed in absolute ethanol (35 cm³) and concentrated hydrochloric acid (35 cm³) for 1 hour then drowned onto ice, filtered and suction dried. Recrystallisation from ethanol yielded 8.7 g of the required compound.

ii) 2-Nitro-4-fluorosulphonyl aniline (0.01 mol) was dispersed in a mixture of acetic:propionic acid (86:14; 25 cm³), cooled to 0°–5° C. and nitrosyl sulphuric acid (0.01 mol) added portionwise at 0°–5° C. The reaction mixture was stirred for 10 minutes at 0°–5° C. then added dropwise to a mixture of the 3-(N,N-diethylamino)acetanilide (0.01 mol), methanol (50 cm³) and ice (50 g). The resultant precipitate was filtered, washed with water and then methanol and oven dried at 50° C. The dry dye has a λmax of 541 nm and gives good fastness to washing, light and heat. The following examples of dyes of Formula:

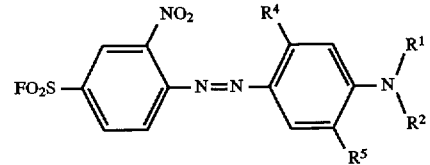

were prepared by the procedure of Example 114

| Example | $R^4$ | $R^1$ | $R^2$ | $R^5$ | λmax/nm |
|---|---|---|---|---|---|
| 115 | —$NHCOCH_3$ | —$C_2H_5$ | —$C_2H_5$ | —H | 541 |
| 116 | —$NHCOCH_3$ | —$C_2H_5$ | —$C_2H_5$ | —$OCH_3$ | 590 |
| 117 | —$NHCOCH_3$ | —$C_2H_4OCOCH_3$ | —$C_2H_4OCOCH_3$ | —$OCH_3$ | 564 |
| 118 | —$CH_3$ | —$C_4H_8OCOCH_3$ | —$C_4H_8OCOCH_3$ | —H | 530 |
| 119 | —$NHCOCH_3$ | —$C_4H_9$ | —$CH(CH_3)C_2H_5$ | —H | 546 |
| 120 | —$NHCOCH_3$ | —$C_4H_9$ | —$C_4H_9$ | —$OCH_3$ | 591 |

-continued

| Example | R⁴ | R¹ | R² | R⁵ | λmax/nm |
|---|---|---|---|---|---|
| 121 | —NHCOCH$_3$ | —C$_5$H$_{11}$ | —C$_5$H$_{11}$ | —OCH$_3$ | 593 |
| 122 | —NHCOC$_2$H$_5$ | —C$_2$H$_5$ | —C$_2$H$_5$ | —OCH$_2$ | 592 |
| 123 | —NHCOC$_3$H$_7$ | —C$_2$H$_5$ | —C$_2$H$_5$ | —OCH$_3$ | 592 |
| 124 | —NHCOCH(CH$_3$)$_2$ | —C$_2$H$_5$ | —C$_2$H$_5$ | —OCH$_3$ | 591 |
| 125 | —NHCOC$_4$H$_9$ | —C$_2$H$_5$ | —C$_2$H$_5$ | —OCH$_3$ | 593 |
| 126 | —OC$_4$H$_9$ | —C$_4$H$_9$ | —C$_4$H$_9$ | —OCH$_3$ | 575 |
| 127 | —HNCOCH$_3$ | —C$_3$H$_7$ | —C$_3$H$_7$ | —OCH$_3$ | 594 |
| 128 | —HNSO$_2$CH$_3$ | —C$_3$H$_7$ | —C$_3$H$_7$ | —OCH$_3$ | 562 |
| 129 | —HNCOCH(CH$_3$)$_2$ | —C$_3$H$_7$ | —C$_3$H$_7$ | —OCH$_3$ | 591 |
| 130 | —HNCOCH$_3$ | —C$_3$H$_7$ | —CH(CH$_3$)$_2$ | —OCH$_3$ | 590 |
| 131 | —HNCOCH$_3$ | —CH(CH$_3$)CH$_2$CH$_3$ | —H | —OCH$_3$ | 565 |
| 132 | —HNCOCH$_3$ | —C$_2$H$_5$ | —C$_3$H$_7$(4-SO$_2$F phenyl) | —OCH$_3$ | 585 |
| 133 | —HNCOCH$_3$ | —C$_3$H$_7$(4-SO$_2$F phenyl) | —C$_3$H$_7$(4-SO$_2$F phenyl) | —OCH$_3$ | 580 |
| 134 | —HNCOC(CH$_3$)$_3$ | —C$_2$H$_5$ | —H | —OCH$_3$ | 566 |
| 135 | —HNCOCH$_3$ | —C$_2$H$_4$COOC$_3$H$_7$ | —C$_2$H$_4$COOC$_3$H$_7$ | —H | 524 |
| 136 | —HNCOCH$_3$ | —C$_2$H$_5$ | —C$_4$H$_8$COOC(CH$_3$)$_3$ | —OCH$_3$ | 591 |
| 137 | —HNCOCH$_3$ | —C$_2$H$_5$ | —C$_2$H$_4$(phenyl) | —OCH$_3$ | 588 |
| 138 | —HNSO$_2$phenyl | —C$_2$H$_5$ | —C$_2$H$_5$ | —OCH$_3$ | 573 |

EXAMPLE 139 i) Preparation of 2-nitro-4-fluorosulphonyl-6-chloroaniline

2-Nitro-4-fluorosulphonylaniline (10 g) was dispersed in 30% HCl (63.6 g), cooled to 0°–5° C. and sodium chlorate (2 g) dissolved in water (3.6 g) added dropwise ensuring maintaining the temperature at 0°–5° C. After 30 minutes reaction mixture drowned onto ice and precipitate collected, washed with water and suction dried to yield 8.5 g of 2-Nitro-4-fluorosulphonyl-6-chloroaniline.

ii) 2-Nitro-4-fluorosulphonyl-6-chloroaniline (7.86 mmol) was dispersed in a mixture of acetic:propionic acid (86:14; 25 cm³), cooled to 0°–5° C. and nitrosyl sulphuric acid (7.86 mmol) added portionwise at 0°–5° C. The reaction mixture was stirred for 10 minutes at 0°–5° C. then added dropwise to a mixture of the 3-(N,N-diethylamino)acetanilide (7.86 mmol), methanol (50 cm³) and ice (50 g). The resultant precipitate was filtered washed with water and then methanol and oven dried at 50° C. The dry dye has a λmax of 550 nm and gives good fastness to washing, light and heat.

The following examples of dyes of Formula:

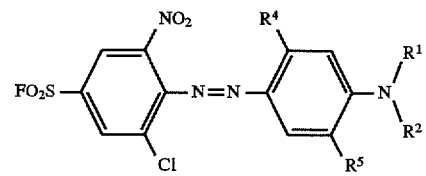

were prepared by the procedure of Example 139

| Example | R⁴ | R¹ | R² | R⁵ | λmax (nm) |
|---|---|---|---|---|---|
| 140 | —NHCOCH$_3$ | —C$_2$H$_5$ | —C$_2$H$_5$ | —H | 550 |
| 141 | —NHCOCH$_3$ | —C$_2$H$_5$ | —C$_2$H$_5$ | —OCH$_3$ | 606 |
| 142 | —CH$_3$ | —C$_4$H$_8$OCOCH$_3$ | —C$_4$H$_8$OCOCH$_3$ | —H | 545 |
| 143 | —CH$_3$ | —C$_2$H$_5$ | —C$_2$H$_4$OCOCH$_3$ | —H | 535 |
| 144 | —NHCOCH$_3$ | —C$_4$H$_9$ | —C$_4$H$_9$ | —OCH$_3$ | 604 |
| 145 | —HNCOCH$_3$ | —C$_3$H$_7$ | —C$_3$H$_7$ | —OCH$_3$ | 610 |
| 146 | —HNCOC(CH$_3$)$_3$ | —C$_2$H$_5$COOCH$_3$ | —C$_2$H$_5$COOCH$_3$ | —OCH$_3$ | 545 |
| 147 | —HNSO$_2$CH$_3$ | —C$_3$H$_7$ | —C$_3$H$_7$ | —OCH$_3$ | 588 |
| 148 | —HNCOCH$_3$ | —C$_2$H$_5$ | —C$_3$H$_7$ | —CH$_3$ | 565 |
| 149 | —HNCOCH$_3$ | —CH(CH$_3$)$_2$ | —C$_3$H$_7$ | —OCH$_3$ | 602 |
| 150 | —HNCOCH(CH$_3$)$_2$ | —C$_3$H$_7$ | —C$_3$H$_7$ | —OCH$_3$ | 608 |
| 151 | —HNCOCH$_3$ | —C$_4$H$_9$ | —C$_2$H$_5$COOC$_2$H$_4$OCH$_3$ | —OCH$_3$ | 603 |
| 152 | —HNCOCH$_3$ | —C$_2$H$_5$ | —CH$_3$ | —OCH$_3$ | 601.5 |
| 153 | —HNCOC(CH$_3$)$_3$ | —H | —C$_2$H$_5$COOC$_3$H$_7$ | —OCH$_3$ | 565 |
| 154 | —HNCOC(CH$_3$)$_3$ | —C$_2$H$_4$COOC$_3$H$_7$ | —C$_2$H$_4$COOC$_3$H$_7$ | —OCH$_3$ | 574 |
| 155 | —HNCOCH$_3$ | —C$_2$H$_5$ | —C$_2$H$_4$(phenyl) | —OCH$_3$ | 607 |

EXAMPLE 156

Preparation of 4-(5-chloro-4-fluorosulphonyl-2-nitrophenylazo)-3-acetamido-6-methoxy-N,N-dibutylaniline i) 2-Nitro-5-chloroacetanilide (10 g) was added cautiously to chlorosulphonic acid (40 cm³) then heated at 120° C. for 2 hours. The reaction mix was cooled to 50° C. and drowned onto ice. The precipitate was filtered, washed with a little water and suction dried. This solid was dispersed in water (20 cm³), p-dioxane (20 cm³) and KF (10 g). After refluxing for 2 hours the reaction mix was drowned into water, the precipitate filtered and suction dried. This solid was refluxed in water (50 cm³) and 36% HCl (50 cm³) for 1 hour, drowned onto ice and the precipitate collected. Yield 3.5 g.

ii) 2-Nitro-4-fluorosulphonyl-5-chloroaniline (7.86 mmol) was dispersed in a mixture of acetic:propionic acid (86:14; 25 cm³), cooled to 0°–5° C. and nitrosyl sulphuric acid (7.86 mmol) added portionwise at 0°–5° C. The reaction mixture was stirred for 10 minutes at 0°–5° C. then added dropwise to a mixture of the 3-(N,N-dibutylamino)-4-methoxyacetanilide (7.86 mmol), methanol (50 cm³) and ice (50 g). The resultant precipitate was filtered washed with water and then methanol and oven dried at 50° C. The dry dye has a λmax of 604 nm and gives good fastness to washing, light and heat.

EXAMPLE 157

Preparation of 4-(2-nitro-4-fluorosulphonyl-6-bromophenylazo)-3-acetamido-N-N-diethylaniline i) 2-Nitro-4-fluorosulphonylaniline (5 g) was dissolved in glacial acetic acid (50 cm³) and bromine (4.4 g) added. Reaction mix warmed to 75° C. for 2 hours then drowned onto ice, filtered, washed with water and suction dried. Yield 6.5 g of yellow solid.

EXAMPLE 162

Preparation of 4-(2-nitro-4-fluorosulphonyl-6-cyanophenylazo)-3-acetamido-N-N-diethylaniline Dye Example 157 (2.0 g) was stirred at 90° C. with CuCN (0.42 g) and DMF (20 cm³) for 3 hours. The reaction mix was drowned onto ice (50 g) and the precipitate collected, washed with water and suction dried. The filter cake was slurried in dichloromethane, filtered and the filtrate evaporated to give a solid dye (λmax 603 nm) which gives good fastness to heat, washing and light.

The following dyes of Formula

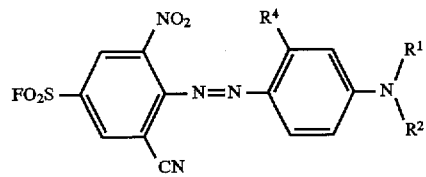

were prepared by the procedure of Example 162

| Example | R⁴ | R¹ | R² | R⁵ | λmax |
|---|---|---|---|---|---|
| 163 | —NHCOCH₃ | —C₂H₄OCOCH₃ | —C₂H₄OCOCH₃ | —H | 585 |
| 164 | —NHCOCH₃ | —C₄H₉ | —CH(CH₃)C₂H₅ | —H | 607 |
| 165 | —NHCOCH₃ | —C₄H₉ | —C₄H₉ | —H | 606 | ii) 2-Nitro-4-fluorosulphonyl-6-bromoaniline (0.01 mol) was dispersed in a mixture of acetic:propionic acid (86:14; 25 cm³), cooled to 0°–5° C. and nitrosyl sulphuric acid (0.01 mol) added portionwise at 0°–5° C. The reaction mixture was stirred for 10 minutes at 0°–5° C. then added dropwise to a mixture of the 3-(N,N-diethylamino)acetanilide (0.01 mol), methanol (50 cm³) and ice (50 g). The resultant precipitate was filtered washed with water and then methanol and oven dried at 50° C. The dry dye has a λmax of 550 nm and gives good fastness to washing, light and heat.

The following dyes of Formula

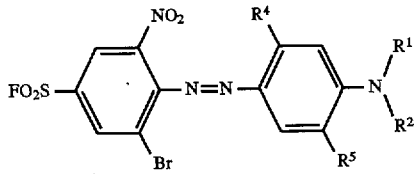

were prepared by the procedure of Example 157

EXAMPLE 166

Preparation of 4-(3-carboethoxy-5-nitrothien-2-ylazo)-3-methyl-N-ethyl-N-(3-fluorosulphonylbenzoyloxyethylaniline 4-(3-carboethoxy-5-nitrothienyl-2-ylazo)-3-methyl-N-ethyl-N-hydroxyethyl aniline (5 mmol) was disolved in chloroform (20 cm³), potassium carbonate (0.7 g) and 3-fluorosulphonylbenzoylchloride (12 g) were added and the mixture refluxed for 2 hours. The reaction mixture was filtered and the filtrate evaporated to leave the solid dye, λmax=588 nm.

The following examples of dyes of Formula

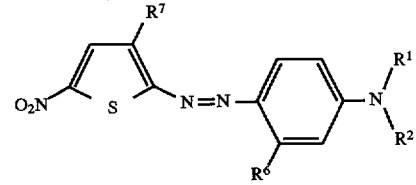

were prepared by the procedure of Example 166

| Example | R⁴ | R¹ | R² | R⁵ | λmax |
|---|---|---|---|---|---|
| 158 | —NHCOCH₃ | —C₂H₄OCOCH₃ | —C₂H₄OCOCH₃ | —H | 530 |
| 159 | —NHCOCH₃ | —C₄H₉ | —CH(CH₃)C₂H₅ | —H | 556 |
| 160 | —NHCOCH₃ | —C₄H₉ | —C₄H₉ | —H | 555 |

| Example | R¹ | R² | R⁶ | R⁷ | λmax/nm |
|---------|-----|-----|-----|-----|---------|
| 167 | —C₂H₅ | —C₄H₈OCO(3-SO₂Fphenyl) | —CH₃ | —COOC₂H₅ | 616 |
| 168 | —C₂H₄CN | —C₂H₄OCO(3-SO₂Fphenyl) | —H | —NO₂ | 575 |
| 169 | —C₂H₄CN | —C₂H₄OCO(3-SO₂Fphenyl) | —CH₃ | —NO₂ | 594 |
| 170 | —C₂H₄CN | —C₂H₄OCO(3-SO₂Fphenyl) | —H | —COOC₂H₅ | 575 |
| 171 | —C₂H₄CN | —C₂H₄OCO(3-SO₂Fphenyl) | —H | —COCH₃ | 563 |

EXAMPLE 172

Preparation of 4-(3-carboethoxy-5-nitrothien-2-ylazo)-3-methyl-N-ethyl-N-(4-fluorosulphonylphenyl)methyl aniline 2-Amino-3-carboethoxy-5-nitrothiophene (0.01 mol) was dispersed in a mixture of acetic:propionic acid (86:14, 25 cm³), cooled to 0°–5° C. and nitrosylsulphuric acid (0.01 mol) added portionwise at 0°–5° C. The reaction mixture was stirred for 10 minutes at 0°–5° C. then added dropwise to a mixture of the N-ethyl-N-(4-fluorosulphonylbenzyl)-3-toluidine (0.01 mol), methanol (50 cm³) and ice (50 g). The resultant precipitate was filtered washed with water and then methanol and oven dried at 50° C. The dry dye has a λmax of 580 nm and gives good fastness to washing, light and heat.

The N-ethyl-N-(4-fluorosulphonylbenzyl)-3-toluidine was prepared as follows: N-Ethyl-3-toluidine (0.01 mol), potassium carbonate (0.01 mol), DMF (50 cm³) and 4-fluorosulphonylbenzyl bromide (0.2 mol) were stirred at 100° C. for 24 hours. The reaction mix was filtered, drowned onto ice and extracted with dichloromethane to give an impure product (22 g). No further purification was required.

The 4-fluorosulphonylbenzylbromide was prepared as follows: Tosyl chloride (50 g), bromine (43 g) and carbon tetrachloride (500 mls) were stirred at reflux while shining a UV lamp (365 nm) onto the reaction. Once the solution became colourless the reaction was stopped and the solvent removed by evaporation. The resultant oil was refluxed in water (200 mls) and potassium fluoride (47 g) for three hours. After three hours the reaction mix was drowned onto ice (500 g) and the precipitate collected, washed with water and dried in vacuo. Yield 34 g of pale yellow crystals which by GLC is 54% required material, 17% starting material and 12% dibrominated species.

EXAMPLE 173

Preparation of 4-(3-carboethoxy-5-nitrothien-2-ylazo)-N-ethyl-N-(4-fluorosulphonylphenyl)methylaniline 2-Amino-3-carboethoxy-5-nitrothiophene (0.01 mol) was dispersed in a mixture of acetic:propionic acid (86:14; 25 cm³), cooled to 0°–5° C. and nitrosyl sulphuric acid (0.01 mol) added portionwise at 0°–5° C. The reaction mixture was stirred for 10 minutes at 0°–5° C. then added dropwise to a mixture of the N-(4-fluorosulphonylbenzyl)-N-ethylaniline (0.01 mol), methanol (50 cm³) and ice (50 g). The resultant precipitate was filtered washed with water and then methanol and oven dried at 50° C. The dry dye has a λmax of 560 nm and gives good fastness to washing, light and heat.

The N-ethyl-N-(4-fluorosulphonylbenzyl)aniline was prepared as follows:

N-Ethylaniline (0.01 mol), potassium carbonate (0.01 mol), DMF (50 cm³) and 4-fluorosulphonylbenzyl bromide (0.2 mol) were stirred at 100° C. for 24 hours. The reaction mix was filtered, drowned onto ice and extracted with dichloromethane to give an impure product (20 g). No further purification was required.

EXAMPLE 174

Preparation of 4-(3-carboethoxy-5-nitrothien-2-ylazo)-N-ethyl-N(4-fluorosulphonylphenyl)propylaniline 2-Amino-3-carboethoxy-5-nitrothiophene (0.01 mol) was dispersed in a mixture of acetic:propionic acid (86:14; 25 cm³), cooled to 0°–5° C. and nitrosyl sulphuric acid (0.01 mol) added portionwise at 0°–5° C. The reaction mixture was stirred for 10 minutes at 0°–5° C. then added dropwise to a mixture of the N-(4-fluorosulphonylphenylpropyl)-N-ethylaniline (0.01 mol), methanol (50 cm³) and ice (50 g). The resultant precipitate was filtered washed with water and then methanol and oven dried at 50° C. The dry dye has a λmax of 593 nm and gives good fastness to washing, light and heat.

The N-ethyl-N-(4-fluorosulphonylphenylpropyl)aniline was prepared as follows:

N-Ethylaniline (0.01 mol), potassium carbonate (0.01 mol), DMF (50 cm³) and 4-fluorosulphonylphenylpropyl bromide (0.2 mol) were stirred at 100° C. for 24 hours. The reaction mix was filtered, drowned onto ice and extracted with dichloromethane to give an impure product (25 g). No further purification was required.

The 4-fluorosulphonylphenylpropylbromide was prepared as follows:

Phenylpropyl bromide (19.9 g) was dissolved in chloroform (500 mls) and chlorosulphonic acid (116 g) added dropwise. Stirred for 12 hours at 40° C. then drowned onto ice (10 kg). The white precipitate was collected, redissolved in dichloromethane, washed with water, dried over magnesium sulphate and evaporated to a pale yellow oil that crystallised on standing. Yield 15 g. This solid was dissolved in p-dioxane (50 mls) and KF (10 g) and refluxed for three hours. After cooling to ambient the reaction mixture was drowned onto ice (400 g), extracted with dichloromethane (3×200 mls), dried over magnesium sulphate and evaporated to a brown oil. Yield 9 g.

EXAMPLE 175

Preparation of 4-(3-carboethoxy-5-nitrothien-2-ylazo)-N-(2-cyanoethyl)-N-(4-fluorosulphenylphenyl)ethylaniline 2-Amino-3-carboethoxy-5-nitrothiophene (0.01 mol) was dispersed in a mixture of acetic:propionic acid (86:14; 25 cm³), cooled to 0°–5° C. and nitrosyl sulphuric acid (0.01 mol) added portionwise at 0°–5° C. The reaction mixture was stirred for 10 minutes at 0°–5° C. then added dropwise to a mixture of the N-(2-cyanoethyl)-N-(4-fluorosulphonyl phenylethyl)aniline (0.01 mol), methanol (50 cm³) and ice (50 g). The resultant precipitate was filtered washed with water and then methanol and oven dried at 50° C. The dry dye has a λmax of 547 nm and gives good fastness to washing, light and heat.

The N-(2-cyanoethyl)-N-(4-fluorosulphonylphenylethyl) aniline was prepared as follows:

N-(2-cyanoethyl)aniline (0.01 mol), potassium carbonate (0.01 mol), DMF (50 cm³) and 4-fluorosulphonylphenylpropylbromide (0.0 mol) were stirred at 100° C. for 24 hours. The reaction mix was filtered, drowned onto ice and extracted with dichloromethane to give an impure product (25 g). No further purification was required.

The 4-fluorosulphonylphenylpropylbromide was prepared as follows:

Phenylethyl bromide (36.5 g) was dissolved in chloroform (500 mls) and chlorosulphonic acid (233 g) added dropwise. Stirred for 12 hours at ambient then drowned onto ice (10kg). The white precipitate was collected, redissolved in dichloromethane, washed with water, dried over magnesium sulphate and evaporated to a pale yellow oil that crystallised on standing. Yield 40.8 g. This solid was dissolved in p-dioxane (200 mls) and KF (24.7 g) and refluxed for three hours. After cooling to ambient the reaction mixture was drowned onto ice (700 g), extracted with dichloromethane (3×200 mls), dried over magnesium sulphate and evaporated to a brown oil. Yield 33.7 g.

EXAMPLE 176

Preparation of 4-(3,5-dinitrothien-2-ylazo)-N-ethyl-N-(4-fluorosulphonylphenyl)methyl aniline 2-Amino-3,5-dininrothiophene (0.01 mol) was dispersed in a mixture of acetic:propionic acid (86:14; 25 cm³), cooled to 0°–5° C. and nitrosyl sulphuric acid (0.01 mol) added portionwise at 0°–5° C. The reaction mixture was stirred for 10 minutes at 0°–5° C. then added dropwise to a mixture of the N-ethyl-N-(4-fluorosulphonylbenzyl)aniline (0.01 mol), methanol (50 cm³) and ice (50 g). The resultant precipitate was filtered washed with water and then methanol and oven dried at 50° C. The dry dye has a λmax of 605 nm and gives good fastness to washing, light and heat.

EXAMPLE 177

Preparation of 4-(3,5-dinitrothien-2-ylazo)-N-ethyl-N-(4-fluorosulphonylphenyl)propyl aniline 2-Amino-3,5-dinitrothiophene (0.01 mol) was dispersed in a mixture of acetic:propionic acid (86:14; 25 cm³), cooled to 0°–5° C. and nitrosyl sulphuric acid (0.01 mol) added portionwise at 0°–5° C. The reaction mixture was stirred for 10 minutes at 0°–5° C. then added dropwise to a mixture of the N-ethyl-N-(4-fluorosulphonylphenylpropyl)aniline (0.01 mol), methanol (50 cm³) and ice (50 g). The resultant precipitate was filtered washed with water and then methanol and oven dried at 50° C. The dry dye has a λmax of 617 nm and gives good fastness to washing, light and heat.

EXAMPLE 178

Preparation of 4-(3,5-dinitrothien-2-ylazo-N-(2-cyanoethyl)-N-(4-fluorosulphonylphenyl)ethyl aniline 2-Amino-3,5-dinitrothiophene (0.01 mol) was dispersed in a mixture of acetic:propionic acid (86:14; 25 cm³), cooled to 0°–5° C. and nitrosyl sulphuric acid (0.01 mol) added portionwise at 0°–5° C. The reaction mixture was stirred for 10 minutes at 0°–5° C. then added dropwise to a mixture of the N-(2-cyanoethyl), N-(4-fluorosulphonylphenylethyl) aniline (0.01 mol), methanol (50 cm³) and ice (50 g). The resultant precipitate was filtered, washed with water and methanol and oven dried at 50° C. The dry dye has a λmax of 580 nm and gives good fastness to washing, light and heat.

The following examples of dyes of Formula

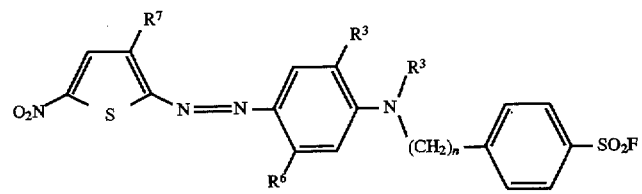

were prepared using the procedure of Example 172, the fluorosulphonylphenylalkyl bromides were prepared as described in examples 172, 174 and 175 as appropriate.

| EG | $R_7$ | $R_6$ | $R_3$ | $R_1$ | n | λmax/nm |
|---|---|---|---|---|---|---|
| 179 | —COOC$_2$H$_5$ | —H | —H | —C$_2$H$_5$ | 3 | 593 |
| 180 | —COOC$_2$H$_5$ | —NHCOCH$_3$ | —H | —C$_2$H$_5$ | 3 | 605.5 |
| 181 | —COOC$_2$H$_5$ | —CH$_3$ | —H | —CH(CH$_3$)CH$_2$CH$_3$ | 3 | 614 |
| 182 | —COOC$_2$H$_5$ | —CH$_3$ | —OCH$_3$ | —C$_4$H$_9$ | 3 | 636 |
| 183 | —COOC$_2$H$_5$ | —CH$_3$ | —OCH$_3$ | —C$_2$H$_5$ | 3 | 631 |
| 184 | —COOC$_2$H$_5$ | —CH$_3$ | —OCH$_3$ | —CH(CH$_3$)$_2$ | 1 | 594 |
| 185 | —COOC$_2$H$_5$ | —CH$_3$ | —OCH$_3$ | —C$_2$H$_5$ | 2 | 621.5 |
| 186 | —COOC$_2$H$_5$ | —CH$_3$ | —OCH$_3$ | —H | 2 | 595 |
| 187 | —COOC$_2$H$_5$ | —NHCOCH$_3$ | —OCH$_3$ | —C$_2$H$_5$ | 1 | 641 |
| 188 | —COOC$_2$H$_5$ | —H | —H | —C$_4$H$_9$ | 3 | 585 |
| 189 | —NO$_2$ | —H | —H | —C$_4$H$_9$ | 3 | 637 |

EXAMPLE 190

Preparation of 4-(2,4-dinitrophenylazo)-3-acetamido-6-methoxy-N-secbutyl-N-(4-fluorosulphonylphenyl)methyl aniline 2,4-Dinitroaniline (0.01 mol) was dispersed in a mixture of acetic:propionic acid (86:14; 25 cm$^3$), cooled to 0°–5° C. and nitrosyl sulphuric acid (0.01 mol) added portionwise at 0°–5° C. The reaction mixture was stirred for 10 minutes at 0°–5° C. then added dropwise to a mixture of the 3-(N-(4-fluorosulphonylbenzyl)-N-secbutylamino)-4-methoxyacetanilide (0.01 mol), methanol (50 cm$^3$) and ice (50 g). The resultant precipitate was filtered washed with water and then methanol and oven dried at 50° C. The dry dye has a λmax of 575 nm and gives good fastness to washing, light and heat.

The 3-(N-(4-fluorosulphonylbenzyl)-N-sec-butylamino)-4-methoxyacetanilide was prepared as follows:
3-(N-sec-butyl)amino-4-methoxyacetanilide, potassium carbonate (0.01 mol), DMF (50 cm$^3$) and 4-fluorosulphonylbenzyl bromide (0.2 mol) were stirred at 100° C. for 24 hours. The reaction mix was filtered, drowned onto ice and extracted with dichloromethane to give an impure product (22 g). No further purification was required.

EXAMPLE 191

Preparation of 4-(2,4-dinitro-6-bromophenylazo)-3-acetamido-6-methoxy-N-secbutyl-N-(4-fluorosulphonylphenyl)methyl aniline 2,4-Dinitro-6-bromoaniline (0.01 mol) was dispersed in a mixture of acetic:propionic acid (86:14; 25 cm$^3$), cooled to 0°–5° C. and nitrosyl sulphuric acid (0.01 mol) added portionwise at 0°–5° C. The reaction mixture was stirred for 10 minutes at 0°–5° C. then added dropwise to a mixture of the 3-(N-(4-fluorosulphonylbenzyl)-N-sec butylamino)-4methoxyacetanilide (0.01 mol), methanol (50 cm$^3$) and ice (50 g). The resultant precipitate was filtered washed with water and then methanol and oven dried at 50° C. The dry dye has a λmax of 594 nm and gives good fastness to washing, light and heat.

EXAMPLE 192

Preparation of 4-(2,4-dinitro-6-cyanophenylazo)-3-acetamido-6-methoxy-N-secbutyl-N-(4-fluorosulphonylphenyl)methyl aniline The dye from Example 191 (2.2 mmol) was dissolved in DMF (30 cm$^3$) and CuCN (0.2 g) and stirred at 60° C. for 1 hour. The reaction mix was drowned onto ice and the precipitate filtered. The dried filter cake was slurried in dichloromethane, filtered and the filtrate evaporated to a solid dye with λmax of 642 nm.

EXAMPLE 193

Preparation of 4-(2,4-dinitro-6-chlorophenylazo)-3-methyl-6-methoxy-N-n-butyl-N-(4-fluorosulphonylphenyl)n-propyl aniline The method of Example 191 was used except that 2,4-dinitro-6-chloroaniline (0.01 mol) was used in place of the 2,4-dinitro-6-bromoaniline and 3-(N-(4-fluorosulphonylphenyl)propyl-N-n-butyl-6-methoxy) toludine (0.01 mol) was used in place of the 3-(N-(4-fluorosulphonylbenzyl)-N-secbutyl-4-methoxyacetanilide.

The dye has a λmax of 586.5 nm and gives good fastness to washing, light and heat.

EXAMPLE 194

Preparation of 4-(2,4-dinitrophenylazo)-3-methyl-N-ethyl-N-(4-(3-fluorosulphonylbenzoyloxyl)n-butyl) aniline 2,4-Dinitroaniline (0.01 mol) was dispersed in a mixture of acetic:propionic acid (86:14; 25 cm$^3$), cooled to 0°–5° C. and nitrosyl sulphuric acid (0.01 mol) added portionwise at 0°–5° C. The reaction mixture was stirred for 10 minutes at 0°–5° C. then added dropwise to a mixture of the N-ethyl-N-hydroxybutyl-3-toluidine (0.01 mol), methanol (50 cm$^3$) and ice (50 g). The resultant precipitate was filtered washed with water and then methanol and oven dried at 50° C. The hydroxy dye (5 mmol) was dissolved in chloroform (20 cm$^3$), potassium carbonate (0.7 g) and m-(sulphonylfluoride) benzoyl chloride (1.2 g) and refluxed for 2 hours. The reaction mix was filtered and the filtrate evaporated to yield a solid violet dye which gives good fastness to washing, light and heat.

EXAMPLE 195

Preparation of 4-(2,4-dinitro-6-bromophenylazo)-3-acetamido-N-n-propyl-N-(3-fluorosulphonylbenzoyloxy)ethyl aniline 2,4-Dinitro-6-bromoaniline (0.01 mol) was dispersed in a mixture of acetic:propionic acid (86:14; 25 cm$^3$), cooled to 0°–5° C. and nitrosyl sulphuric acid (0.01 mol) added portionwise at 0°–5° C. The reaction mixture was stirred for 10 minutes at 0°–5° C. then added dropwise to a mixture of the 3-(N-propyl-N-hydroxyethyl)acetanilide (0.01 mol), methanol (50 cm$^3$) and ice (50 g). The resultant precipitate was filtered washed with water and then methanol and oven dried at 50° C. The hydroxy dye (5 mmol) was dissolved in chloroform (20 cm$^3$), potassium carbonate (0.7 g) and m-(sulphonylfluoride) benzoyl chloride (1.2 g) and refluxed for 2 hours. The reaction mix was filtered and the filtrate evaporated to yield a solid dye (λmax 552 nm) which gives good fastness to washing, light and heat.

EXAMPLE 196

Preparation of 4-(2-chloro-5-fluorosulphonylphenylazo)-N-ethyl-N-benzyl aniline

3-Amino-4-chloro benzene sulphonyl fluoride (2 parts) was stirred in acetic/propionic acid 86/14 vol/vol (25 parts) and cooled to 0°–5° C. Nitrosyl sulphuric acid solution (3.8 parts) was added dropwise at 0°–5° C. and stirred under these conditions for 2 hours. The diazo solution was then added to a mixture of N-ethyl-N-benzyl aniline (2.7 parts), methanol (100 parts) and sulphamic acid (1 part) stirring at 0°–5° C. After stirring under these conditions for 30 mins, ice/water (100 parts) was added and the mixture stirred for a further 1 hour. The product was isolated by filtration, washed with water and pulled dry. The damp solid was then slurried in methanol (100 parts) and refiltered. Dried at 50° C. to yield 4-(2-chloro-5-fluorosulphonylphenylazo)-N-ethyl-N-benzyl aniline (2.3 parts).

When applied to polyester materials from an aqueous dispersion, the dye gave yellow shades. λmax 463 nm.

The following examples of dyes of Formula

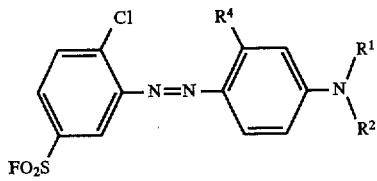

were prepared by the procedure of Example 196

| Example | R¹ | R² | R⁴ | λmax/nm |
|---|---|---|---|---|
| 197 | —C₂H₄CN | —C₂H₄CN | —H | 421 |
| 198 | —C₂H₄CN | —C₂H₄COOCH₂CN | —H | 429 |
| 199 | —C₂H₄CN | —C₂H₄CN | —CH₃ | 429 |
| 200 | —C₂H₄CN | —C₂H₄COOC₂H₅ | —NHCOCH₃ | 466 |
| 201 | —C₂H₄OCOCH₃ | —C₂H₄OCOCH₃ | —NHCOCH₃ | 473 |
| 202 | —C₂H₅ | —C₂H₄CN | —H | 442 |
| 203 | —C₂H₅ | —C₂H₄CN | —CH₃ | 449 |
| 204 | —C₄H₉ | —C₂H₄CN | —H | 444 |
| 205 | —C₄H₈OCOCH₃ | —C₄H₈OCOCH₃ | —CH₃ | 477 |
| 206 | —C₂H₅ | —CH₂phenyl | —CH₃ | 469 |

EXAMPLE 207

Preparation of 4-(2-chloro-4-fluorosulphonylphenylazo)-N-ethyl-N-benzyl aniline

3-Chloro-4-amino benzene sulphonylfluoride (1 part) was stirred in acetic/propionic acid 86/14 vol/vol (15 parts) and cooled to −5° C. Nitrosyl sulphuric acid solution (1.9 parts) was added dropwise then stirred at 0°–5° C. for 2 hours. The diazo solution was then added to a stirred mixture of N-ethyl-N-benzyl aniline (2.0 parts), methanol (50 parts), sulphamic acid (0.5 parts) and sodium acetate (5 parts) with ice/water (100 parts) at 0°–5° C. After stirring under these conditions for 1 hour, the dye was filtered off and washed well with water. The damp solid was slurried in methanol (100 parts) and re-filtered. Dried at 50° C. to yield the product 4-(2-chloro-4-fluorosulphonyl phenylazo)-N-ethyl-N-benzyl aniline (1.5 parts). When applied to polyester materials from an aqueous dispersion the dye gave orange shades. λmax 483 nm

EXAMPLE 208

Preparation of 4-(2-chloro-4-fluorosulphonylphenylazo)-3-acetamido-N-N-bis(2-acetoxyethyl)aniline The procedure of Example 207 was repeated except that in place of 2 parts of N-ethyl-N-benzyl aniline; 2 parts of N,N-bis(2-acetoxyethyl)aminoacetanilide were used to yield the product, 4-(2-chloro-4-fluorosulphonylphenylazo)-3-acetamido-N,N-bis(2-acetoxyethyl)aniline (1.2 parts). When applied to polyester materials from an aqueous dispersion, the dye gave orange shades. λmax 494 nm.

EXAMPLE 209

Preparation of 4-(2-methoxy-5-fluorosulphonylphenylazo)-3-methyl-N-ethyl-N-benzylaniline 3-Amino-4-methoxy benzene sulphonylfluoride (1 part) was stirred in acetic/propionic acid 86/14 vol/vol (15 parts) and cooled to 0°–5° C. Nitrosyl sulphuric acid solution (1.9 parts) was dropwise and stirred at 0°–5° C. for 2 hours. The diazo solution was then added to a stirred mixture of N-ethyl-N-benzyl-m-toluidine (1.3 parts), methanol (50 parts), sulphamic acid (0.5 parts) and sodium acetate (5 parts) stirring in ice/water at 0°–5° C. After stirring for 2 hours under these conditions, the dye was filtered off and washed well with water. The damp solid was slurried in water and re-filtered. The dye was then stirred in methanol at room temperature for 1 hour, filtered, and dried at 50° C. to yield the product, 4-(2-methoxy-5-fluorosulphonylphenylazo)-3-methyl-N-ethyl-N-benzyl aniline (1.5 parts). When applied to polyester materials from an aqueous dispersion, the dye gave yellow shades. λmax 450.

The following examples of dyes of Formula

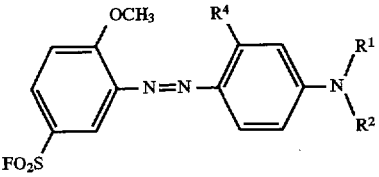

were prepared by the procedure of Example 209

| Example | R¹ | R² | R⁴ | λmax/nm |
|---|---|---|---|---|
| 210 | —C₄H₈OCOCH₃ | —C₄H₈OCOCH₃ | —CH₃ | 455 |
| 211 | —C₂H₅ | —C₂H₄CN | —H | 449 |
| 212 | —C₂H₅ | —H | —CH₃ | 429 |
| 213 | —C₂H₅ | —CH₂phenyl | —H | 444 |

EXAMPLE 214

Preparation of 4-(4-chloro-5-fluorosulphonylphenylazo)-N,N-bis(2-cyanoethyl)aniline i) 2—Chloro-5-nitro benzene sulphonic acid (484 parts) was charged to a flask then quickly added thionyl chloride (1190 parts) and dimethyl formamide (12 parts). The resultant slurry was heated to 60° C. and stirred at 60°–65° C. for a total of 5 hours. The mixture was cooled to room temperature then poured onto ice/water. The precipitated solid was filtered off and washed with cold water before drying in vac oven to yield the product 2-chloro-5-nitro benzene sulphonylchloride (395 parts).

ii) 2—Chloro-5-nitro benzene sulphonylchloride (40 parts) was stirred in p-dioxane (48 parts) at room temperature. Potassium fluoride (10 parts) dissolved in water (35 parts) was added, and the mixture heated to 70° C. Stirred at 70° C. for 4 hours then cooled to room temperature and poured onto ice/water. Allowed to stand for 2 days then filtered off the precipitate and dried in air to yield the product 2-chloro-5-nitro benzene sulphonylfluoride (36 parts).

iii) The 2-chloro-5-nitro benzene sulphonylfluoride (2.4 parts) was stirred in glacial acetic acid (25 parts) with iron powder (2 parts). Heated to reflux and stirred at reflux for 2.5 hours, then cooled to room temperature, poured onto ice/water and allowed to stand at room temperature overnight. The resultant precipitate was filtered off and dried in air to yield the product 2-chloro-5-amino benzene sulphonylfluoride (0.8 parts).

iv) 2-Chloro-5-amino benzene sulphonylfluoride (2.1 parts) was stirred in acetic/propionic acid 86/14 vol/vol (25 parts) and cooled to 0°–5° C. Nitrosyl sulphuric acid solution (3.8 parts) was added and stirred at 0°–5° C. for 3 hours. The diazo solution was then added to a mixture of N,N-bis (2-cyanoethyl)aniline (2.1 parts), methanol (75 parts) and sulphamic acid (1 part) stirring in ice/water (75 parts) at 0°–5° C. Stirred under these conditions for 1 hour then allowed to stand at room temperature overnight before filtering off the dye. The solid was dried overnight to yield the product 4-(4-chloro-5-fluorosulphonylphenylazo)-N,N-bis(2-cyanoethyl)aniline (3.6 parts). The dye, when applied to polyester material from an aqueous dispersion, gave yellow shades. λmax 414 nm.

The following Examples of dyes of Formula

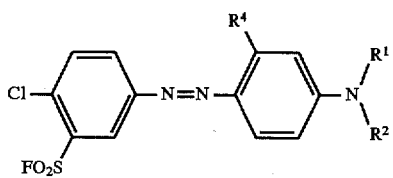

were prepared by the procedure of Example 214

| Example | R¹ | R² | R⁴ | λ max/ nm |
|---|---|---|---|---|
| 215 | —C$_2$H$_4$OCOCH$_3$ | —C$_2$H$_4$OCOCH$_3$ | —NHCOCH$_3$ | 476 |
| 216 | —C$_2$H$_4$CN | —C$_2$H$_4$COOC$_2$H$_5$ | —NHCOCH$_3$ | 466 |
| 217 | —C$_2$H$_4$CN | —C$_2$H$_4$CN | —CH$_3$ | 421 |
| 218 | —C$_2$H$_5$ | —CH$_2$phenyl | —H | 459 |
| 219 | —C$_2$H$_4$CN | —C$_2$H$_4$COOCH$_2$CN | —H | 421 |

EXAMPLE 220

Preparation of 4-(3-nitro-5-fluorosulphonylthien-2-ylazo)-3-acetamido-N,N-diethylamino)aniline i) 2—Chlorosulphonyl-5-chlorothiophene (19.8 parts) was added to fuming nitric acid (80 parts), allowing to exotherm to 35° C. Heated to 50° C. and stirred under these conditions for 2 hours. Cooled to room temperature then poured onto ice/water with vigorous stirring. The white solid was filtered off and dried to yield the product 2-chlorosulphonyl-4-nitro-5-chlorothiophene (19 parts).

ii) 2—Chlorosulphonyl-4-nitro-5-chlorothiophene (20.1 parts) were stirred in p-dioxane (80 parts) at room temperature. Potassium fluoride (5.2 parts) in water (20 parts) was added and the mixture heated to 50° C. Stirred under these conditions for 4 hours, then cooled and poured onto ice/water. Ethyl acetate was then added to extract the product and separated. Dried over magnessium sulphate then screened and concentrated to yield the product 2-fluorosulphonyl-4-nitro-5-chloro thiophene (20.4 parts).

iii) The 2-fluorosulphonyl-4-nitro-5-chlorothiophene (20.4 parts), was added to methanol (240 parts) with hexamine (22.5 parts). Heated to reflux and stirred under these conditions for 4 hours. Cooled to room temperature and poured onto 10% sulphuric acid solution (250 parts). The product was extracted out with ethyl acetate, separated and dried over magnessium sulphate, then screened and concentrated to yield the product 2-fluorosulphonyl-4-nitro-2-aminothiophene (16 parts).

iv) 2-Fluorosulphonyl-4-nitro-5-aminothiophene (4.2 parts) was added over 30 mins to a stirred solution of acetic/propionic acid 86/14 vol/vol (60 parts) with nitrosyl sulphuric acid solution (10 parts) at 0°–5° C. Stirred under these conditions for 4 hours. The diazo solution was then added to a mixture of 3-N,N-diethyl aminoacetanilide (4.2 parts), water (40 parts), methanol (15 parts), and sulphamic acid (1 part) stirring in 50% sulphuric acid solution at 0°–5° C. Stirred under these conditions for 45 mins then filtered off the dye and washed well with water. Dried in the oven overnight to yield the product 4-(3-nitro-5-fluorosulphonylthien-2-ylazo)-3-acetamido-N,N-(diethylamino)aniline (0.6 parts). When applied to polyester materials from an aqueous dispersion, the dye gave blue shades. λmax 615 nm.

EXAMPLE 221

Preparation of 4-(3-nitro-5-fluorosulphonylthien-2-ylazo)-3-methyl-N-N-diethylaminoaniline The procedure of Example 220iv) was repeated except that in place of the 3-N,N-diethylaminoacetanilide 0.4 parts of 3-methyl-N,N-diethylaminoaniline was used to yield 4-(3-nitro-5-fluorosulphonylthien-2ylazo)-3-methyl-N,N-diethylaminoaniline (0.3 parts). When applied to polyester materials from an aqueous dispersion the dye gave blue shades. λmax 629 nm.

General Method for the Preparation of Dye Examples 222–238 i) Preparation of 2-nitro-4-fluorosulphonylaniline

N-acetyl sulphanilyl chloride (100 g) was dissolved in concentrated sulphuric acid (515 cm³), cooled to 4° C. and a mixture of concentrated nitric acid (38.6 cm³) and concentrated sulphuric acid (42.9 cm³) added dropwise maintaining the temperature at 4°–6° C. After hour the reaction mix was drowned onto ice and the precipitate collected, extracted into dichloromethane and evaporated to a yellow solid (92 g). 31 g of this yellow solid was refluxed for 3 hours in water (20 cm³), p-dioxane (20 cm³) and KF (19.4 g). then drowned onto ice and the precipitate collected. This precipitate was refluxed in absolute ethanol (35 cm³) and concentrated hydrochloric acid (35 cm³) for 1 hour then drowned onto ice, filtered and suction dried. Recrystallisation from ethanol yielded 8.7 g of the required compound.

ii) Preparation of 2-nitro-4-fluorosulphonyl-6-chloroaniline

2-Nitro-5-chloracetanilide (10 g) was added cautiously to chlorosulphonic acid (40 cm³) then heated at 120° C. for 2 hours. The reaction mix was cooled to 50° C. and drowned onto ice. The precipitate was filtered, washed with a little water and suction dried. This solid was dispersed in water (20 cm³), p-dioxane (20 cm³) and KF (10 g). After refluxing for 2 hours the reaction mix was drowned into water, the precipitate filtered and suction dried. This solid was refluxed in water (50 cm³) and 36% HCl (50 cm³) for 1 hour, drowned onto ice and the precipitate collected. Yield 3.5 g. 2-Nitro-4-fluorosulphonylaniline (0.01 mol) (for dyes 222–230) or 2-nitro-6-chloro-4-fluorosulphonyl-aniline (0.01 mol) (for dyes 231–238) was dispersed in a mixture of acetic:propionic acid (86:141 (25ml) and cooled to 0°–5° C. and nitrosylsulphuric acid (0.01 mol) was then added portionwise at 0°–5° C. The reaction mixture was stirred for 10 min. at 0°–5° C. and then added dropwise to a mixture of the required coupler (0.01 mol), methanol (50 ml) and ice (50 g) maintaining the acidity between pH3 and pH5 by addition of sodium acetate. The resultant precipitate was filtered, washed with water and then methanol 1:1 water and dried in air. The dry dye, when applied to polyester as an aqueous dispersion, gave good fastness to washing, light and heat.

(i) Preparation of Couplers for Dye Examples 222–224, 226, 229 and 231–235 Method 1

Dye Examples 222–224, 226, 229 and 231–235 were prepared from the appropriate N,N-dialkyl-(3-ethylsuccinamido-6-methoxy)aniline coupling components which were prepared according to the following method. A mixture of 3-(N,N-dialkyl)-4-methoxyaniline (0.01 mol), ethylsuccinyl chloride (0.01 mol) and pyridine (0.01 mol) in dichloromethane (50 ml) was stirred and heated under gentle reflux for 4 h and then allowed to cool and was then drowned out into water. The resulting product was extracted into dichloromethane, dried (MgSO$_4$) and evaporated to dryness in vacuo to yield the required Coupler as a brown oil.

(ii) Preparation of Couplers for Dye Examples 225, 227, 228, 230 and 236–238—Method 2

Dye Examples 225, 227, 228, 230 and 236–238 were prepared from the appropriate N,N-dialkyl-(3-ethylsuccinamido-6-methoxy)aniline coupling components which were prepared according to the following method. A mixture of 3-(N,N-dialkylamino)-4-methoxyaniline (0.01 mol) and succinic anhydride (0.01 mol) in anhydrous toluene (50 ml) was stirred for 1.5 h and then evaporated to dryness in vacuo to give a brown gum. The brown gum (the carboxylic acid intermediate) was esterified by treatment with an appropriate alcohol (0.1 mol) and conc. sulphuric acid (1 ml) at 100° C. for 1 h and was then allowed to cool. The mixture was drowned out into water and the product was extracted into ethyl acetate, dried (MgSO$_4$) and evaporated to dryness in vacuo to yield the required coupler as a brown oil.

Dye Examples 222–238 are summarised below

| Example | R$^{14}$ | R$^1$ | R$^2$ | R$^{22}$ | max/nm |
|---|---|---|---|---|---|
| 222 | —H | —C$_3$H$_7$ | —C$_3$H$_7$ | —C$_2$H$_5$ | 592 |
| 223 | —H | —C$_2$H$_5$ | —C$_2$H$_5$ | —C$_2$H$_5$ | 590 |
| 224 | —H | —C$_4$H$_9$ | —C$_4$H$_9$ | —C$_2$H$_5$ | 594 |
| 225 | —H | —C$_2$H$_5$ | —C$_2$H$_5$ | —C$_4$H$_9$ | 591 |
| 226 | —H | —C$_2$H$_5$ | —CH$_2$phenyl | —C$_2$H$_5$ | 585 |
| 227 | —H | —C$_2$H$_5$ | —C$_2$H$_5$ | —CH(CH$_3$)CH$_2$CH(CH$_3$)$_2$ | 590 |
| 228 | —H | C$_2$H$_5$ | —C$_2$H$_5$ | —CH$_2$phenyl | 591 |
| 229 | —H | —C$_2$H$_5$ | —C$_2$H$_4$phenyl | —C$_2$H$_5$ | 588 |
| 230 | —H | —C$_2$H$_5$ | —C$_2$H$_5$ | —CH$_2$(tetrahydrofuran-2-yl) | 590 |
| 231 | —Cl | —C$_3$H$_7$ | —C$_3$H$_7$ | —C$_2$H$_5$ | 609 |
| 232 | —Cl | —C$_2$H$_5$ | —CH$_2$phenyl | —C$_2$H$_5$ | 601 |
| 233 | —Cl | —C$_4$H$_9$ | —C$_4$H$_9$ | —C$_2$H$_5$ | 610 |
| 234 | —Cl | —C$_2$H$_5$ | —C$_2$H$_5$ | —C$_2$H$_5$ | 607 |
| 235 | —Cl | —C$_2$H$_5$ | —CH(CH$_3$)CH$_2$CH$_3$ | —C$_2$H$_5$ | 606 |
| 236 | —Cl | —C$_2$H$_5$ | —C$_2$H$_5$ | —C$_4$H$_9$ | 607 |
| 237 | —Cl | —C$_2$H$_5$ | —C$_2$H$_5$ | —CH(CH$_3$)CH$_2$CH(CH$_3$)$_2$ | 607 |
| 238 | —Cl | —C$_2$H$_5$ | —C$_2$H$_5$ | —CH$_2$phenyl | 607 |

Preparation of Dye Examples 239–246

Dye Examples 239–246 were prepared using the same general method as was used for the preparation of dye examples 222–238. The dyes, when applied to polyester as aqueous dispersions, gave good fastness to washing light and heat.

The couplers for dye Examples 239, 240 and 246 were prepared from 3-(N,N-diethylamino)-4-methoxyaniline according to the method using acetylsalicoyl chloride (0.01 mol) in place of ethylsuccinyl chloride.

The coupler for dye Example 241 was prepared from 3-(N,N-diethylamino)-4-methoxyaniline according to the method 1 using butylchloroformate (0.01 mol) in place of ethylsuccinyl chloride. The coupler for dye Example 242 was prepared from 3-(N,N-diethylamino)-4-methoxyaniline according to the method 1 using ethylmalonyl chloride (0.01 mol) in place of ethylsuccinyl chloride.

The coupler for dye Example 243 was prepared from 3-(N,N-diethylamino)-4-methoxyaniline according to the method 2 using maleic anhydride (0.01 mol) in place of succinic anhydride and ethanol as the esterifying alcohol.

The coupler for dye Example 244 was prepared from 3-(N,N-diethylamino)-4-methoxyaniline according to the method 2 using 2,2-dimethylsuccinic anhydride (0.01 mol) in place of succinic anhydride and ethanol as the esterifying alcohol.

The coupler for dye Example 245 was prepared from 3-(N,N-diethylamino)-4-methoxyaniline according to the method 1 using 4-methoxycarbonylphenylchloroformate (0.01 mol) in place of ethylsuccinyl chloride.

Dye Examples 239–246 are summarised below

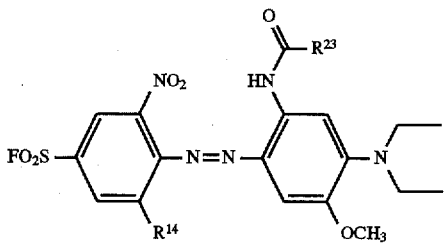

| Example | R¹⁴ | R²³ | $\lambda_{max}$/nm |
|---|---|---|---|
| 239 | —H | 2-OCOCH₃phenyl | 598 |
| 240 | —H | 2-OHphenyl | 590 |
| 241 | —H | —OC₄H₉ | 587 |
| 242 | —H | —CH₂COOC₂H₅ | 591 |
| 243 | —H | —CH=CHCOOC₂H₅ | 596 |
| 244 | —H | —CH₂C(CH₃)₂COOC₂H₅ | 592 |
| 245 | —H | 4-COOCH₃phenyl | 573 |
| 246 | —Cl | 4-OCOCH₃phenyl | 601 |

EXAMPLE 247

Preparation of 5-(2,5-dichloro-4-fluorosulphonylphenylazo)-4,6-diaminopropylthiopyrimidine The procedure of Example 1 was repeated except that in place of the 1.6 parts of N,N-bis-(2-cyanoethyl)aniline; 1.5 parts of 4,6-diamino-2-propylthiopyrimidine were used. The product, 5-(2,5-dichloro-4-fluorosulphonylphenylazo)-4,6-diaminopropylthiopyrimidine (3.4 parts) $\lambda$max=420 nm, when applied to polyester materials from an aqueous dispersion gives bright yellow shades with excellent fastness to light and wet treatments.

EXAMPLE 248

Preparation of 4-(2,5-dichloro-4-fluorosulphonylphenylazo)-3-chloro-N-ethyl-N-methylphthalimidoaniline The procedure of Example 1 was repeated except that in place of the 1.6 parts of N,N-bis-(2-cyanoethyl)aniline; 2.6 parts of 3-chloro-N-ethyl,N-methylphthalimidoaniline were used. The product, 4-(2,5-dichloro-4-fluorosulphonylphenylazo)-3-chloro-N-ethyl,N-methylphthalimidoaniline (4.0 parts) $\lambda$max=455 nm, when applied to polyester materials from an aqueous dispersion gives orange shades with excellent fastness to light and wet treatments.

EXAMPLE 249

Preparation of 4-(2f5-dichloro-4-fluorosulphonylphenylazo)-3-methylmorpholinobenzene The procedure of Example 1 was repeated except that in place of the 1.6 parts of N,N-bis-(2-cyanoethyl)aniline; 1.5 parts of 3-methylmorpholinobenzene were used. The product, 4-(2,5-dichloro-4-fluorosulphonylphenylazo)-3-methylmorpholinobenzene (1.9 parts) $\lambda$max=480 nm, when applied to polyester materials from an aqueous dispersion gives dull bluish red shades with excellent fastness to light and wet treatments.

EXAMPLE 250

Preparation of 4-(2-nitro-4-fluorosulphonyl-6-chlorophenylazo)-1-(N-ethylamino)naphthalene The procedure of Example 139 was used expect that 1-(N-ethylamino)naphthalene (7.86 nmol) was used in place of the 3-(N,N-diethylamino)acetanilide. The dye has a $\lambda_{max}$ of 571 nm.

EXAMPLE 251

Preparation of 4-(2-nitro-4-fluorosulphonyl-6-chlorophenylazo)-1-(N-ethyl-N-n-propylamino)naphthalene The procedure of Example 139 was used except that 1-(N-ethyl-N-n-proylamino)naphthalene was used in place of the 3-(N,N-diethylamino)acetanilide. The dye has a $\lambda_{max}$ of 578 nm.

EXAMPLE 252

Preparation of 4-(4,8-difluorosulphonylnaphth-2-ylazo)N-N-diethylaniline

To a mixture of 2-amino-4,8difluorosulphonylnaphthalene (1.6 parts) and acetic/propionic acid mixture (20 parts, 86/14 vol/vol), stirring at 0.5° C., was added dropwise nitrosyl sulphuric acid soln (1.5 parts). The mixture was stirred at this temperature,for a further 15 mins.

The diazo solution was added to a mixture of N,N-diethylaniline (0.9 parts), methanol (50 parts) and sulphamic acid (0.5 parts); stirring at 0.5° C. After stirring for 2 hours at this temperature, the product was isolated by filtration, washed with water and dried at 50° C. to yield; 4-(4,8-difluorosulphonylnaphthyl-2-azo)-N,N-diethylaniline (1.6 parts). When applied to polyester materials from an aqueous dispersion, the dye gives red shades with excellent fastness to wet treatments. $\lambda$max of 500 nm.

The following Examples of dyes of Formula

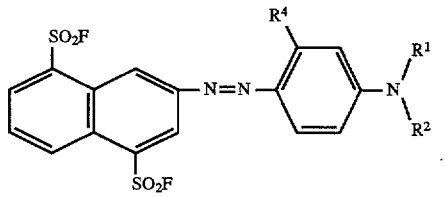

were prepared by the procedure of Example 252:

| Example | R¹ | R² | R⁴ | $\lambda$max |
|---|---|---|---|---|
| 253 | —C₄H₉ | —C₄H₉ | —H | 509 |
| 254 | —C₂H₅ | —C₂H₅ | —CH₃ | 519 |
| 255 | —C₂H₅ | —C₂H₅ | —NHCOCH₃ | 530 |
| 256 | —C₂H₄CN | —C₂H₄CN | —H | 460 |

EXAMPLE 257

Preparation of 4-(2-cyan-4-nitrophenylazo)-N-ethyl-N-2-(4-fluorosulphonylphenoxy)ethylaniline To a mixture of 2-cyano-4-nitroaniline (1.5 parts) and acetic/propionic acid mixture (10 parts, 86/14 vol/vol), stirring at 0.5° C., was added dropwise nitrosyl sulphuric acid soln (2.0 parts). The mixture was stirred at this temperature for a further 30 mins.

The diazo solution was added to a mixture of N-ethyl,N-2-(4-fluorosulphonylphenoxyl)-ethylaniline (3.0 parts), methanol (50 parts) and sulphamic acid (0.5 parts); stirring at 0.5° C. After stirring for 2 hours at this temperature, the product was isolated by filtration, washed with water and dried at 50° C. to yield; 4-(2-cyano-4-nitrophenylazo)-N-ethyl,N-2-(4-fluorosulphonylphenoxy)ethylaniline (3.0 parts). When applied to polyester materials from an aqueous dispersion, the dye gives bluish red shades with excellent light fastness and excellent fastness to wet treatments. λmax of 530 nm.

EXAMPLE 258

Preparation of 4-(3-acetyl-5-nitrothien-2-ylazo)-N-ethyl-N-2-(4-fluorosulphonylphenyoxy)ethylaniline The procedure of Example 257 was repeated except that in place of the 1.5 parts of 2-cyano-4-nitroaniline; 1.7 parts of 2-amino-3-acetyl-5-notrothiophene were used. The product 4-(3-acetyl-5-nitrothienyl-2-azo)-N-ethyl,N-2-(4-fluorosulphonylphenoxy)ethylaniline (2.0 parts) when applied to polyester materials from an aqueous dispersion gives reddish blue shades with excellent fastness to light and wet treatments. λmax of 590 nm.

EXAMPLE 259

Preparation of 4-(2-chloro-4-nitrophenylazo)-3-methyl-N-ethyl-N-2-fluorosulphonylphenoxy)ethylaniline To chlorosulphonic acid (17.5 parts) stirring at 0.5° C., was added gradually 3 -methyl -4 -(2 -chloro-4 -nitrophenylazo)-N-ethyl, N-2-phenoxyethylaniline (8.0 parts). Thionyl chloride (5.4 parts) was added and the mixture was stirred at 0.5° C. for 2 hours. The reaction mixture was drowned into ice/water (500 parts), the product was isolated by filtration and washed acid-free with cold water.

The filter cake was set stirring with 1,4-dioxan (40 parts) and a solution of potassium fluoride (1.8 parts) in water (1.0 parts) was added. The mixture was heated at 60° C. for 3 hours, cooled to ambient and the product was isolated by filtration to yield; 3-methyl-4-(2-chloro-4-nitrophenylazo)-N-ethyl,N-2-(4-fluorosulphonylphenoxy)ethylaniline (4.5 parts).

The product when applied to polyester materials from an aqueous dispersion gives mid red shades with excellent fastness to light and wet treatments. λmax of 510 nm.

EXAMPLE 260

Preparation of 4-(6-thiocyanatobenzothiazol-2-ylazo)-N-ethyl-N-2-(4-fluorosulphonylphenoxy)ethylanaline The procedure of Example 257 was repeated except that in place of the 1.5 parts of 2-cyano-4-nitroaniline; 1.9 parts of 2-amino-6-thiocyanatobenzthiazole were used.

The product, 4-(6-thiocyanatobenzthiazolyl-2-azo)-N-ethyl,N-2-(4-fluorosulphonylphenoxy)ethylaniline (1.4 parts) When applied to polyester materials from an aqueous dispersion gives bluish red shades with excellent fastness to light and wet treatments. λmax of 522 nm.

EXAMPLE 261

Preparation of 4-(2,6-dichloro-4-nitrophenylazo)-N-ethyl-N-2-(4-fluorosulphonylphenoxy)ethylaniline The procedure of Example 257 was repeated except that in place of the 1.5 parts of 2-cyano-4-nitroaniline; 1.9 parts of 2-amino-6-thiocyanatobenzthiazole were used.

The product, 4-(6-thiocyanatobenzthiazolyl-2-azo)-N-ethyl,N-2-(4-fluorosulphonylphenoxy)ethylaniline (1.4 parts) when applied to polyester materials from an aqueous dispersion gives bluish red shade with excellent fastness to light and wet treatments. λmax of 522 nm.

EXAMPLE 262

Preparation of 4-(6-thiocyanatobenzothiazol-2-ylazo)-3-N-ethyl-N-2-(4-fluorosulphonylphenoxy)ethylaniline The procedure of Example 257 was repeated except that in place of the 3.0 parts of N-ethyl,N-2-(4-fluorosulphonylphenoxy)ethylaniline, 3.1 parts of N-ethyl, N-2-(4-fluorosulphonylphenoxy)ethyl-m-toluidine were used.

The product, 3-methyl-4-(6-thiocyanatobenzthiazolyl-2-azo)-N-ethyl,N-2-(4-fluorosulphonylphenoxy)ethylaniline (1.7 parts) when applied to polyester materials from an aqueous dispersion gives violet shades with excellent fastness to light and wet treatments. λmax of 540 nm.

EXAMPLES 263 AND 264

Dyes prepared by the procedure described for Example 139 but using the 1-naphthylamino in place of 3-(N,N-diethylamino)acetanilide are of Formula:

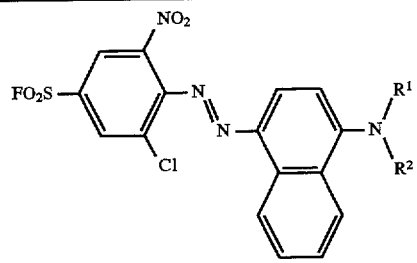

| Example | R₁ | R₂ | max/nm |
|---|---|---|---|
| 263 | C₂H₅ | H | 571 |
| 264 | C₂H₅ | C₃H₇ | 578 |

EXAMPLE 265

Preparation of 1-n-butyl-5(2,5-dichloro-4-fluorosulphonylphenylazo)-3-cyano-6-hydroxy-4-methyl-2-oxo-IH-pyridine The procedure of Example 1 was repeated except that in place of the 3.0 g of 3-methyl-N-ethyl-N-(2-benzoyloxyethyl)aniline., 1.8 g of 1-n-butyl-3-cyano-6-hydroxy-4-methyl-2-oxo-IH-pyridine were used. The product 1-n-butyl-5(2,5-dichloro-4-fluorosulphonylphenylazo).-3-cyano-6-hydroxy-4-methyl-2-oxo-IH-pyridine (2.5 g) when applied to polyester materials from aqueous dispersion gives greenish yellow shades with excellent wet and light fastness properties. λmax=435 nm.

EXAMPLE 266

Preparation of 1-phenyl-3-t-butyl-5-amino-4-(2,5-dichloro-4-fluorosulphonylphenylazo)pyrazole The procedure of Example 1 was repeated except that in place of the 3.0 g of 3-methyl-N-ethyl-N-(2-benzoyloxyethyl)aniline., 1.5 g of 1-phenyl-3-t-butyl-5-aminopyrazole were used. The product 1-phenyl-3-t-butyl-5-amino-4-(2,5-dichloro-4-fluorosulphonylphenylazo)pyrazole (2.1 g) when applied to polyester materials form aqueous dispersion gives greenish yellow shades with excellent wet and light fastness properties. λmax=442 nm.
EXAMPLES 267–278
The dyes of the following formulae may be made by the procedure of Example 1 by diazotising the appropriate amino and coupling onto the appropriate coupling component
EXAMPLE 267
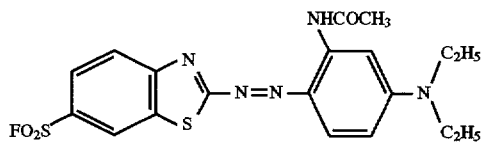
EXAMPLE 268
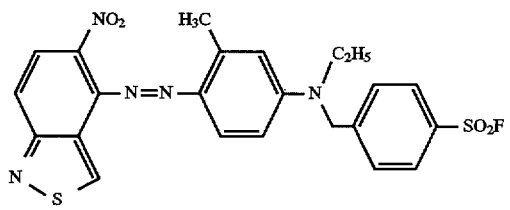
EXAMPLE 269
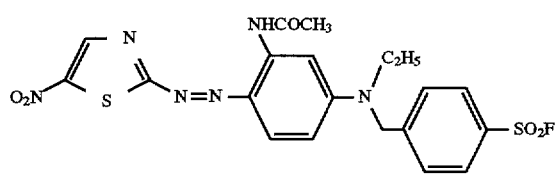
EXAMPLE 270
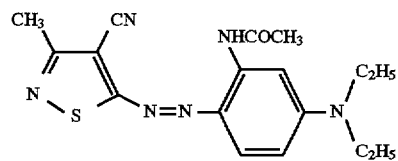
EXAMPLE 271
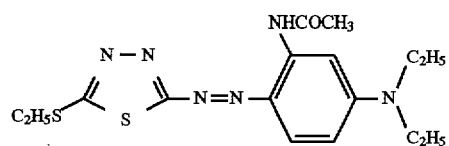
EXAMPLE 272
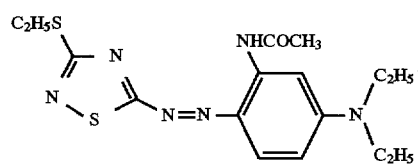
EXAMPLE 273
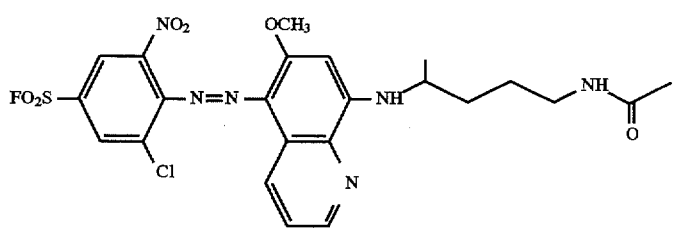
EXAMPLE 274
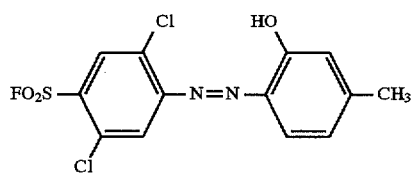

EXAMPLE 275

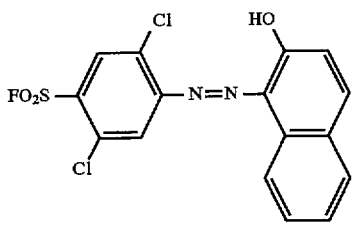

EXAMPLE 276

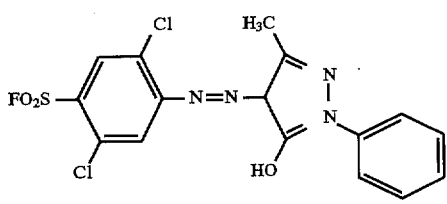

EXAMPLE 277

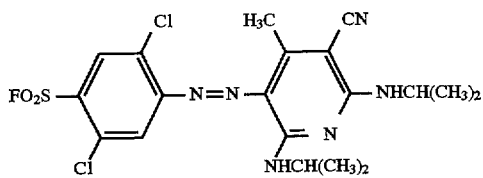

EXAMPLE 278

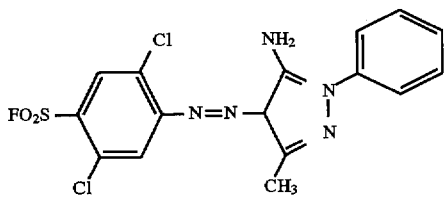

I claim:
1. A compound which is free from water solubilising groups of Formula (1):

$$A—N=N—D \qquad \text{Formula (1)}$$

wherein

A and D each independently is a heterocyclic or carbocyclic group, which is unsubstituted or is substituted by one or more substituents selected from the group consisting of cyano, hydroxy, nitro, fluoro, chloro, bromo, iodo, fluorosulphonyl, trifluoromethyl, alkyl, alkoxy, aryl, aryloxy, fluorosulphonylaryl, fluorosulphonylaryloxy, —COalkyl, —COOalkyl, —OCOalkyl, —COaryl, —COOaryl, —OCOaryl, —NHCOalkyl, —NHCOaryl, —NHSO$_2$alkyl, —NHSO$_2$aryl, —Salkyl, —Saryl, —SO$_2$alkyl, —SO$_2$aryl, —SCN, —NR$^1$R$^2$ in which R$^1$ and R$^2$ each independently is —H, alkyl, aryl or cycloalkyl, and groups of Formula R$^{19}$—N—Y—X—W in which Y is a direct link or C=O, X is a direct link, alkyl, alkenyl, aryl, heterocyclic, alkylOalkyl, alkylNHalkyl or —NR$^{20}$—Z— or —O—Z— in which Z is alkyl, alkenyl, aryl, heterocyclic, alkylOalkyl, alkylNHalkyl or a direct link and R$^{20}$ is —H, alkyl, aryl or alkylaryl, W is —CO$_2$R$^{21}$, —OCOR$^{21}$, —OH or —CN in which R$^{21}$ is alkyl, aryl, alkylaryl, alkylOalkyl or alkylOH, and R$^{19}$ is —H or substituted or unsubstituted alkyl, each of the alkyl, alkoxy, aryl, aryloxy parts of the above substituents for A, D, R$^1$ and R$^2$ being unsubstituted or substituted by one or more of —OH, —CN, —F, —Cl, —Br, —I, —SO$_2$F, alkoxy, alkenyl, phenyl, phenylSO$_2$F, aryloxy, aryloxySO$_2$F, —N(alkyl)$_2$, —OCOalkyl, —OCOalkylCl, —COOalkyl, —COOalkylOH, —COOalkylCN, —COOalkylCOalkyl, —COOalkylphenyl, —OCOphenyl, —COphenylSO$_2$F, —OCOphenylNO$_2$, —OCOphenylalkyl, —OCOphenylalkoxy, —COOphenyl, —OCO(fluorosulphonylphenyl), —OalkylCN, —COOalkylOalkyl, —COOalkylOphenyl, —OCOalkylOphenyl, —COOalkylOalkylOalkyl, —OCOalkylCOOalkyl, —OalkylCOOalkyl, —OalkylCOOalkylOalkyl, —OalkylCOOalkylCOOalkyl, —OalkylOCOalkylOalkyl, —COOalkylOCOalkyl or —COOalkylCOOalkyl,

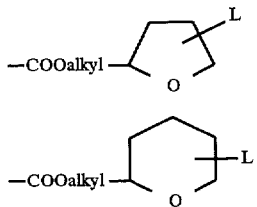

in which L is —H or alkyl, at least one of A or D being substituted by at least one —SO$_2$F group or is substituted by at least one substituent which is itself substituted by at least one —SO$_2$F group, and at least one of A or D is substituted by at least one ester group or is substituted by at least one substituent which is itself substituted by at least one ester group, provided that one of A$^1$ or D$^1$ is not

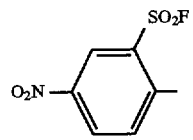

and except for the compound 4-(4-fluorosulphonylphenylazo)-N-ethyl-N-acetoxyethylaniline.

2. A compound according to claim 1 in which the compound of Formula (1) is of Formula (3):

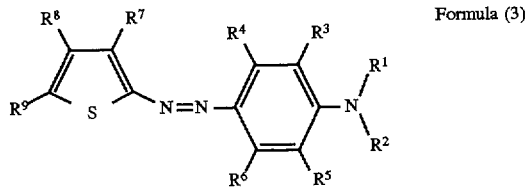

Formula (3)

wherein

R$^1$ and R$^2$ each independently is —H, substituted or unsubstituted C$_{1-6}$-alkyl or substituted or unsubstituted aryl;

$R^3$, $R^4$, $R^5$ and $R^6$ each independently is —H, —F, —Cl, —Br, —I, —SO$_2$F or substituted or unsubstituted $C_{1-6}$-alkyl, $C_{1-6}$-alkoxy, $C_{1-6}$alkanoylamino, —NHSO$_2$alkyl or phenoxy;

$R^7$, $R^8$ and $R^9$ each independently is —H, $C_{1-6}$-alkyl, —NO$_2$, —COOC$_{1-6}$-alkyl, —OCOalkyl, —Cl, —F, —Br, —I, —COC$_{1-6}$-alkyl, —CN, formyl, protected formyl or —SO$_2$F, provided that at least one of $R^1$ to $R^9$ is —SO$_2$F or is a substituent which is itself substituted by at least one —SO$_2$F group, and provided that $R^7$ and $R^9$ are not both —SO$_2$F.

3. A compound according to claim 1 in which A and D each independently is selected from thienyl, thiazolyl, isothiazolyl, pyrazolyl, imidazolyl, pyridyl, pyridonyl, 1,2,4- and 1,3,4-thiadiazolyl, furanyl, pyrrolyl, pyridazyl, pyrimidyl, pyrazinyl, benzothiazolyl, benzoisothiazolyl, quinolinyl, isoquinolinyl, indolyl, pyridothiazolyl, pyridoisothiazolyl, 1,2,3-triazolyl, 1,2,4-triazolyl, phenyl and naphthyl.

4. A compound according to claim 1 in which A and D each independently is selected from thienyl, phenyl, naphthyl, thiazolyl, isothiazolyl, pyridonyl, quinolinyl.

5. A compound according to claim 1 in which A and D each independently is selected from thien-2-yl, phenyl, naphth-1-yl, naphth-2-yl, thiazol-2-yl, isothiazol-5-yl, pyrid-4-one-5-yl or quinolinyl.

6. A compound according to claim 1 in which A is thien-2-yl or phenyl and D is phenyl or naphth-1-yl.

7. A compound according to claim 1 in which the compound of Formula (1) is of Formula (4):

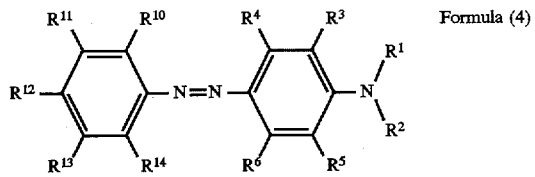

Formula (4)

wherein
$R^1$ and $R^2$ each independently is —H, substituted or unsubstituted $C_{1-6}$-alkyl or substituted or unsubstituted aryl;

$R^3$, $R^4$, $R^5$ and $R^6$ each independently is —H, —F, —Cl, —Br, —I, —O$_2$F or substituted or unsubstituted $C_{1-6}$alkyl, $C_{1-6}$-alkoxy, $C_{1-4}$-alkanoylamino, —NHSO$_2$alkyl or -phenoxy; and $R^{10}$ to $R^{14}$ each independently is —H, alkoxy, alkyl, —NO$_2$, —SO$_2$F, —F, —Cl, —Br, —I or —CN; provided that when $R^{10}$ is SO$_2$F, $R^{12}$ is not —NO$_2$ and $R^{11}$, $R^{13}$ and $R^{14}$ are not all —H.

8. A compound according to claim 1 in which the compound of Formula (1) is of Formula (7):

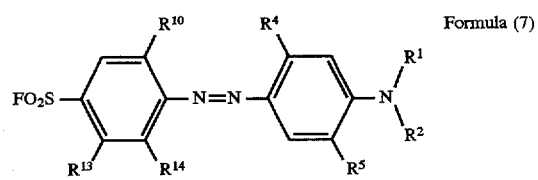

Formula (7)

in which
$R^1$ and $R^2$ each independently is substituted or unsubstituted $C_{1-6}$-alkyl;

$R^4$ is alkyl or a group of Formula $R^{19}$—N—Y—X—W in which Y is a direct link or C=O, X is a direct link, alkyl, alkenyl, aryl, heterocyclic, alkylOalkyl, —NR$^{20}$—Z—, —COOZ or —O—Z in which Z is alkyl, alkenyl, aryl, heterocyclic, alkylOalkyl or a direct link and $R^{20}$ is —H, alkyl, aryl or alkylaryl, W is —CO$_2$R$^{21}$, —OCOR$^{21}$ or —OH in which $R^{21}$ is alkyl, aryl, alkylaryl, alkylOalkyl or alkylOH, and $R^{19}$ is —H or alkyl;

$R^5$ is —H, $C_{1-6}$-alkoxy or phenoxy;

$R^{10}$ is —NO$_2$ or —Cl; and $R^{13}$ and $R^{14}$ each independently is —H or —Cl.

9. A compound according to claim 1 in which the compound of Formula (1) is of Formula (5):

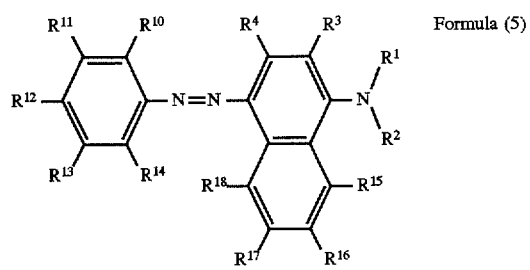

Formula (5)

wherein $R^1$ and $R^2$ each independently is —H or substituted or unsubstituted $C_{1-6}$-alkyl;

$R^3$ is substituted or unsubstituted $C_{1-6}$-alkyl or $C_{1-6}$-alkoxy;

$R^4$ is substituted or unsubstituted $C_{1-6}$-alkyl or $C_{1-6}$-alkoxy;

$R^{10}$ is substituted or unsubstituted $C_{1-6}$-alkyl, NO$_2$ or Cl;

$R^{15}$ to $R^{18}$ each independently is —H, —$C_{1-6}$-alkyl, —$C_{1-6}$-alkoxy, —F, —Cl, —Br, —I, —SO$_2$F, —NO$_2$, —CN or —NR$^1$R$^2$;

$R^{12}$ is —NO$_2$ or —SO$_2$F;

$R^{11}$ is —H; and $R^{13}$ and $R^{14}$ each independently is —H or —Cl.

10. A dispersion comprising a compound which is free from water solubilising groups of Formula (1):

A—N=N—D   Formula (1)

wherein

A and D each independently is an substituted or unsubstituted heterocyclic or carbocyclic group and at least one of A or D carries directly at least one —SO$_2$F group or carries a substituent to which at least one —SO$_2$F group is attached provided that when $A^1$—N=N— is a p-fluorosulphonylphenylazo group, that at least one of the positions ortho or meta to the azo group is substituted, that when $A^1$—N=N— is a m-fluorosulphonylphenylazo group, that at least 2 of the positions ortho or para to the azo group, or meta to both the fluorosulphonyl group are substituted, that when either $A^1$ or $D^1$ is a phenylene group substituted ortho to the azo group by an —SO$_2$F group, neither $A^1$ or $D^1$ are substituted at the position para to the azo group by an NO$_2$ group, and also provided that one of A or D is not 3,5-difluorosulphonylthien-2-yl, 4-fluorosulphonylnaphth-1-yl, substituted or unsubstituted 1-phenyl-pyrazol-4-yl-5-one or

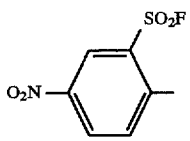

or that one of A or D does not carry an —NCH$_2$CH(OH)CH$_2$Cl, —NCOCH$_2$Cl or —NCH$_3$CH$_2$SO$_2$F substituent and water.

11. A process for colouring polyamide and aromatic polyester textile material or fibre blends thereof which comprises applying to the synthetic textile material a compound, which is free from water solubilising groups, or a mixture of such compounds, of Formula (1):

A—N=N—D      Formula (1)

wherein

A and D each independently is a heterocyclic or carbocyclic group, which is unsubstituted or is substituted by one or more substituents selected from the group consisting of cyano, hydroxy, nitro, fluoro, chloro, bromo, iodo, fluorosulphonyl, trifluoromethyl, alkyl, alkoxy, aryl, aryloxy, fluorosulphonylaryl, fluorosulphonylaryloxy, —COalkyl, —COOalkyl,— OCOalkyl, —COaryl, —COOaryl, —OCOaryl, —NHCOalkyl, —NHCOaryl, —NHSO$_2$alkyl, —NHSO$_2$aryl, —Salkyl, —Saryl, —SO$_2$alkyl, —SO$_2$aryl, —SCN, —NR$^1$R$^2$ in which R$^1$ and R$^2$ each independently is —H, alkyl, aryl or cycloalkyl, and groups of Formula R$^{19}$N—Y—X—W in which Y is a direct link or C=O, X is a direct link, alkyl, alkenyl, aryl, heterocyclic, alkylOalkyl, alkylNHalkyl or —NR$^{20}$—Z— or —O—Z— in which Z is alkyl, alkenyl, aryl, heterocyclic, alkylOalkyl, alkylNHalkyl or a direct link and R$^{20}$ is —H, alkyl, aryl or alkylaryl, W is —CO$_2$R$^{21}$, —OCOR$^{21}$, —OH or —CN in which R$^{21}$ is alkyl, aryl, alkylaryl, alkylOalkyl or alkylOH, and R$^{19}$ is —H or substituted or unsubstituted alkyl, each of the alkyl, alkoxy, aryl, aryloxy parts of the above substituents for A, D, R$^1$ and R$^2$ being unsubstituted or substituted by one or more of —OH, —CN, —F, —Cl, —Br, —I, —SO$_2$F, alkoxy, alkenyl, phenyl, phenylSO$_2$F, aryloxy, aryloxySO$_2$F, —N(alkyl)$_2$, —OCOalkyl, —OCOalkylCl, —COOalkyl, —COOalkylOH, —COOalkylCN, —COOalkylCOalkyl, —COOalkylphenyl, —OCOphenyl, —COphenylSO$_2$F, —OCOphenylNO$_2$, —OCOphenylalkyl, —OCOphenylalkoxy, —COOphenyl, —OCO(fluorosulphonylphenyl), —OalkylCN, —COOalkyCOalkyl, —COOalkyCOphenyl, —OCOalkylOphenyl, —COOalkylOalkylOalkyl, —OCOalkylCOOalkyl, —OalkylCOOalkyl, —OalkylCOOalkylOalkyl, —OalkylCOOalkylCOOalkyl, —OalkylOCOalkyCOalkyl, —COOalkylOCOalkyl or —COOalkylCOOalkyl,

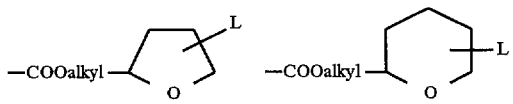

in which L is —H or alkyl, and at least one of A or D is substituted by at least one —SO$_2$F group or is substituted by at least one substituent which is itself substituted by at least one —SO$_2$F group, except for 4-(4-fluorosulphonylphenylazo)-N,N-dimethylaniline, provided that one of A or D is not 3,5-difluorosulphonylthien-2-yl, substituted or unsubstituted 1-phenyl-pyrazol-4-yl-5-one, 4-fluorosulphonylnaphth-1-yl or

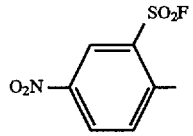

or that one of A or D does not carry an —NCH$_2$CH(OH)CH$_2$Cl, —NCOCH$_2$Cl or —NCH$_2$CH$_2$SO$_2$F substituent.

12. A process for colouring a synthetic textile material or fibre blend thereof which comprises applying to the synthetic textile material a compound, which is free from water solubilising groups, or a mixture of such compounds, of Formula (1):

A—N=N—D      Formula (1)

wherein

A and D each independently is a heterocyclic or carbocyclic group, which is unsubstituted or is substituted by one or more substituents selected from the group consisting of cyano, hydroxy, nitro, fluoro, chloro, bromo, iodo, fluorosulphonyl, trifluoromethyl, alkyl, alkoxy, aryl, aryloxy, fluorosulphonylaryl, fluorosulphonylaryloxy, —COalkyl, —COOalkyl, —OCOalkyl, —COaryl, —COOaryl, —OCOaryl, —NHCOalkyl, —NHCOaryl, —NHSO$_2$alkyl, —NHSO$_2$aryl, —Salkyl, —Saryl, —SO$_2$alkyl, —SO$_2$aryl, —SCN, —NR$^1$R$^2$ in which R$^1$ and R$^2$ each independently is —H, alkyl, aryl or cycloalkyl, and groups of Formula R$^{19}$—N—Y—X—W in which Y is a direct link or C=O, X is a direct link, alkyl, alkenyl, aryl, heterocyclic, alkyCOalkyl, alkylNHalkyl or —NR$^{20}$—Z— or —O—Z— in which Z is alkyl, alkenyl, aryl, heterocyclic, alkylOalkyl, alkylNHalkyl or a direct link and R$^{20}$ is —H, alkyl, aryl or alkylaryl, W is —CO$_2$R$^{21}$, —OCOR$^{21}$, —OH or —CN in which R$^{21}$ is alkyl, aryl, alkylaryl, alkylOalkyl or alkylOH, and R$^{19}$ is —H or substituted or unsubstituted alkyl, each of the alkyl, alkoxy, aryl, aryloxy parts of the above substituents for A, D, R$^1$ and R$^2$ being unsubstituted or substituted by one or more of —OH, —CN, —F, —Cl, —Br, —I, —SO$_2$F, alkoxy, alkenyl, phenyl, phenylSO$_2$F, aryloxy, aryloxySO$_2$F, —N(alkyl)$_2$, —OCOalkyl, —OCOalkylCl, —COOalkyl, —COOalkylOH, —COOalkylCN, —COOalkylCOalkyl, —COOalkylphenyl, —OCOphenyl, —COphenylSO$_2$F, —OCOphenylNO$_2$, —OCOphenylalkyl, —OCOphenylalkoxy, —COOphenyl, —OCO(fluorosulphonylphenyl), —OalkylCN, —COOalkylOalkyl, —COOalkylOphenyl, —OCOalkylOphenyl, —COOalkylOalkylOalkyl, —OCOalkylCOOalkyl, —OalkylCOOalkyl, —OalkylCOOalkylOalkyl, —OalkylCOOalkylCOOalkyl, —OalkylOCOalkylOalkyl, —COOalkylOCOalkyl or —COOalkylCOOalkyl,

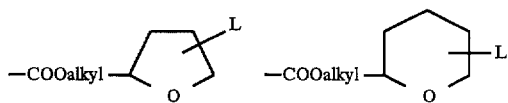

in which L is —H or alkyl, at least one of A or D being substituted by at least one —SO$_2$F group or is substituted by at least one substituent which is itself substituted by at least one —SO$_2$F group, and at least one of A or D is substituted by at least one ester group or is substituted by at least one substituent which is itself substituted by at least one ester group, provided that one of A or D is not

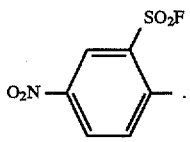

13. A process for colouring a polyester textile material or fibre blend thereof which comprises applying to the polyester textile material a compound or mixture thereof, which is free from water solubilising groups, of Formula (1):

A—N=N—D      Formula (1)

wherein

A and D each independently is a heterocyclic or carbocyclic group, which is unsubstituted or is substituted by one or more substituents selected from the group consisting of cyano, hydroxy, nitro, fluoro, chloro, bromo, iodo, fluorosulphonyl, trifluoromethyl, alkyl, alkoxy, aryl, aryloxy, fluorosulphonylaryl, fluorosulphonylaryloxy, —COalkyl, —COOalkyl,— OCOalkyl, —COaryl, —COOaryl, —OCOaryl, —NHCOalkyl, —NHCOaryl, —NHSO$_2$alkyl, —NHSO$_2$aryl, —Salkyl, —Saryl, —SO$_2$alkyl, —SO$_2$aryl, —SCN, —NR$^1$R$^2$ in which R$^1$ and R$^2$ each independently is —H, alkyl, aryl or cycloalkyl, and groups of Formula R$^{19}$—N—Y—X—W in which Y is a direct link or C=O, X is a direct link, alkyl, alkenyl, aryl, heterocyclic, alkylOalkyl, alkylNHalkyl or —NR$^{20}$—Z— or —O—Z— in which Z is alkyl, alkenyl, aryl, heterocyclic, alkylOalkyl, alkylNHalkyl or a direct link and R$^{20}$ is —H, alkyl, aryl or alkylaryl, W is —CO$_2$R$^{21}$, —OCO R$^{21}$, —OH or —CN in which R$^{21}$ is alkyl, aryl, alkylaryl, alkylOalkyl or alkylOH, and R$^{19}$ is —H or substituted or unsubstituted alkyl, each of the alkyl, alkoxy, aryl, aryloxy parts of the above substituents for A, D, R$^1$ and R$^2$ being unsubstituted or substituted by one or more of —OH, —CN, —F, —Cl, —Br, —I, —SO$_2$F, alkoxy, alkenyl, phenyl, phenylSO$_2$F, aryloxy, aryloxySO$_2$F, —N(alkyl)$_2$, —OCOalkyl, —OCOalkylCl, —COOalkyl, —COOalkylOH, —COOalkylCN, —COOalkylCOalkyl, —COOalkylphenyl, —OCOphenyl, —COphenylSO$_2$F, —OCOphenylNO$_2$, —OCOphenylalkyl, —OCOphenylalkoxy, —COOphenyl, —OCO(fluorosulphonylphenyl), —OalkylCN, —COOalkylOalkyl, —COOalkylOphenyl, —OCOalkylOphenyl, —COOalkylOalkylOalkyl, —OCOalkylCOOalkyl, —OalkylCOOalkyl, —OalkylCOOalkylOalkyl, —OalkylCOOalkylCOOalkyl, —OalkylOCOalkylOalkyl, —COOalkylOCOalkyl or —COOalkylCOOalkyl,

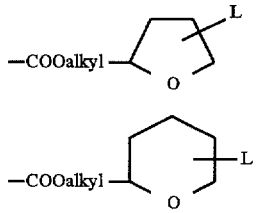

in which L is —H or alkyl, except for 4-(4-fluorosulphonylphenylazo)-N,N-dimethylaniline, provided that one of A or D is not 3,5-difluorosulphonylthien-2-yl, substituted or unsubstituted 1-phenylpyrazol-4-yl-5one, 4-fluorosulphonylnaphth-1-yl or 4-nitro-2-fluorosulphonylphenyl or that one of A or D does not carry an —NCH$_2$CH$_2$SO$_2$F substitutent.

14. A process according to any one of claims 11 to 13 in which A and D each independently is selected from thienyl, thiazolyl, isothiazolyl, pyrazolyl, imidazolyl, pyridyl, pyridonyl, 1,2,4- and 1,3,4-thiadiazolyl, furanyl, pyrrolyl, pyridazyl, pyrimidyl, pyrazinyl, benzothiazolyl, benzoisothiazolyl, quinolinyl, isoquinolinyl, indolyl, pyridothiazolyl, pyridoisothiazolyl, 1,2,3-triazolyl, 1,2,4-triazolyl, phenyl and naphthyl.

15. A process according to any one of claims 11 to 13 in which A and D each independently is selected from thienyl, phenyl, naphthyl, thiazolyl, isothiazolyl, pyridonyl, quinolinyl.

16. A process according to any one of claims 11 to 13 in which A and D each independently is selected from thien-2-yl, phenyl, naphth-1-yl, naphth-2-yl, thiazol-2-yl, isothiazol-5-yl, pyrid-4-one-5-yl or quinolinyl.

17. A process according to any one of claims 11 to 13 in which A is thien-2-yl or phenyl and D is phenyl or naphth-1-yl.

18. A process according to any one of claims 11–13 in which the compound of Formula (1) is of Formula (3):

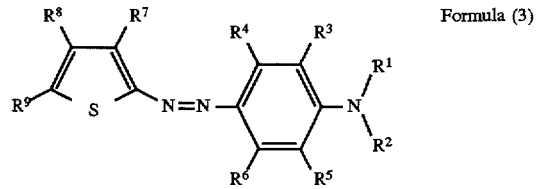

wherein

R$^1$ and R$^2$ each independently is —H, substituted or unsubstituted C$_{1-6}$-alkyl or substituted or unsubstituted aryl;

R$^3$, R$^4$, R$^5$ and R$^6$ each independently is —H , —F, —Cl, —Br, —I, —SO$_2$F or substituted or unsubstituted C$_{1-6}$-alkyl, C$_{1-6}$-alkoxy, C$_{1-4}$alkanoylamino, —NHSO$_2$alkyl or phenoxy;

R$^7$, R$^8$ and R$^9$ each independently is —H, C$_{1-6}$-alkyl, —NO$_2$, —COOC$_{1-6}$-alkyl, —OCOalkyl, —Cl, —F, —Br, —I, —COC$_{1-6}$-alkyl, —CN, formyl, protected formyl or —SO$_2$F provided that at least one of R$^1$ to R$^9$ is substituted by an —SO$_2$F group or is substituted by a substituent which is itself substituted by at least one —SO$_2$F group, and provided that R$^7$ and R$^9$ are not both —SO$_2$F.

19. A process according to any one of claims 11–13 in which the compound of Formula (1) is of Formula (4):

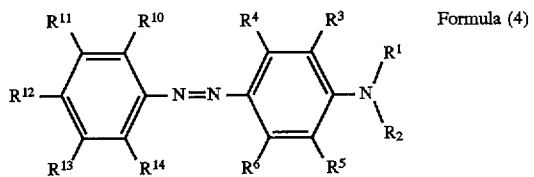

Formula (4)

wherein

R¹ and R² each independently is —H, substituted or unsubstituted $C_{1-6}$-alkyl or substituted or unsubstituted aryl;

R³, R⁴, R⁵ and R⁶ each independently is —H, —F, —Cl, —Br, —I, —SO₂F of substituted or unsubstituted $C_{1-6}$alkyl, $C_{1-6}$-alkoxy, $C_{1-4}$-alkanoylamino, —NHSO₂alkyl or phenoxy; and R¹⁰ to R¹⁴ each independently is —H, alkoxy, alkyl, —NO₂, —SO₂F, —F, —Cl, —Br, —I or —CN; provided that when R¹⁰ is SO₂F, R¹² is not —NO₂ and R¹¹, R¹³ and R¹⁴ are not all —H.

20. A process according to any one of claims 11-13 in which the compound of Formula (1) is of Formula (7):

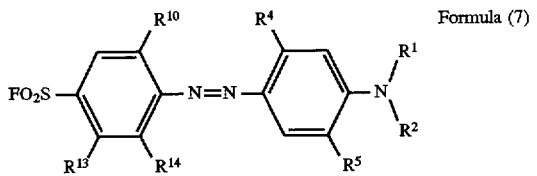

Formula (7)

in which

R¹ and R² each independently is substituted or unsubstituted $C_{1-6}$-alkyl;

R⁴ is alkyl or a group of Formula R¹⁹—N—Y—X—W in which Y is a direct link or C=O, X is a direct link, alkyl, alkenyl, aryl, heterocyclic, alkylOalkyl, —NR²⁰—Z—, —COOZ or —O—Z in which Z is alkyl, alkenyl, aryl, heterocyclic, alkylOalkyl or a direct link and R²⁰ is —H, alkyl, aryl or alkylaryl, W is —CO₂R²¹, —OCOR²¹ or —OH in which R²¹ is alkyl, aryl, alkylaryl, alkylOalkyl or alkylOH, and R¹⁹ is —H or alkyl;

R⁵ is —H, $C_{1-6}$-alkoxy or phenoxy;

R¹⁰ is —NO₂ or —Cl; and

R¹³ and R¹⁴ each independently is —H or —Cl.

21. A process according to any one of claims 11-13 in which the compound of Formula (1) is of Formula (5):

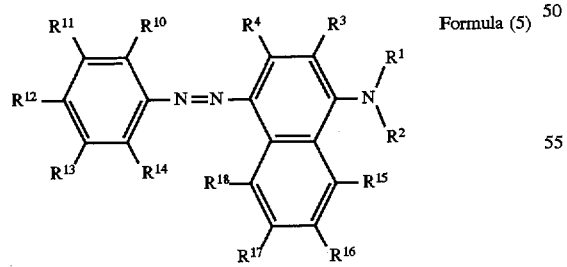

Formula (5)

wherein

R¹ and R² each independently is —H, substituted or unsubstituted $C_{1-6}$-alkyl;

R³ is substituted or unsubstituted $C_{1-6}$-alkyl or $C_{1-6}$-alkoxy;

R⁴ is substituted or unsubstituted $C_{1-6}$-alkyl or $C_{1-6}$-alkoxy;

R¹⁰ is substituted or unsubstituted $C_{1-6}$-alkyl, NO₂ or Cl;

R¹⁵ to R¹⁸ each independently is —H, —$C_{1-6}$-alkyl, —$C_{1-6}$-alkoxy, —F, —Cl, —Br, —I, —SO₂F, —NO₂, —CN or —NR¹R²;

R¹² is —NO₂ or —SO₂F;

R¹¹ is —H; and

R¹³ and R¹⁴ each independently is —H or —Cl.

22. A compound, which is free from water solubilising groups, of Formula (2):

A¹—N=N—D¹                Formula (2)

in which

A¹—N=N— is a substituted or unsubstituted heterocyclic or carbocyclic azo group and D¹ is a coupler, each of A¹ and D¹ independently being selected from thienyl, thiazolyl, isothiazolyl, pyrazolyl, imidazolyl, pyridyl, 1,2,4- and 1,3,4-thiadiazolyl, furanyl, pyrrolyl, pyridazyl, pyridonyl, pyrimidyl, pyrazinyl, benzothiazolyl, benzoisothiazolyl, quinolinyl, isoquinolinyl, indolyl, pyridothiazolyl, pyridoisothiazolyl, 1,2,3-triazolyl, 1,2,4-triazolyl, phenyl and naphthyl, and at least one of A¹ or D¹ carries directly at least one —SO₂F group or carries a substituent to which at least one —SO₂F group is attached, provided that when A¹—N=N— is a p-fluorosulphonylphenylazo group, that at least one of the positions ortho or meta to the azo group is substituted, that when A¹—N=N— is a m-fluorosulphonylphenylazo group, that at least 2 of the positions ortho or para to the azo group, or meta to both the fluorosulphonyl group are substituted, that when either A¹ or D¹ is a phenylene group substituted ortho to the azo group by an —SO₂F group, neither A¹ or D¹ are substituted at the position para to the azo group by an NO₂ group, the substituents for A¹ and D¹ being selected from the group consisting of cyano, hydroxy, nitro, fluoro, chloro, bromo, iodo, fluorosulphonyl, trifluoromethyl, alkyl, alkoxy, aryl, aryloxy, fluorosulphonylaryl, fluorosulphonylaryloxy, —COalkyl, —COOalkyl, —OCOalkyl, —COaryl, —COOaryl, —OCOaryl, —NHCOalkyl, —NHSO₂alkyl, —NHSO₂aryl, —Salkyl, —Saryl, —SO₂alkyl, —SO₂aryl, —SCN, —NR¹R² in which R¹ and R² each independently is —H, alkyl, aryl or cycloalkyl, and groups of Formula R¹⁹—N—Y—X—W in which Y is a direct link or C=O, X is a direct link, alkyl, alkenyl, aryl, heterocyclic, alkylOalkyl, alkylNHalkyl or —NR²⁰—Z— or —O—Z— in which Z is alkyl, alkenyl, aryl, heterocyclic, alkylOalkyl, alkylNHalkyl or a direct link and R²⁰ is —H, alkyl, aryl or alkylaryl, W is —CO₂R²¹, —OCOR²¹, —OH or —CN in which R²¹ is alkyl, aryl, alkylaryl, alkylOalkyl or alkylOH, and R¹⁹ is —H or substituted or unsubstituted alkyl, each of the alkyl, alkoxy, aryl, aryloxy parts of the above substituents for A, D, R¹ and R² being unsubstituted or substituted by one or more of —OH, —CN, —F, —Cl, —Br, —I, —SO₂F, alkoxy, alkenyl, phenyl, phenylSO₂F, aryloxy, aryloxySO₂F, —N(alkyl)₂—OCOalkyl, —OCOalkylCl, —COOalkyl, —COOalkylOH, —COOalkylCN, —COOalkylCOalkyl, —COOalkylphenyl, —OCOphenyl, —COphenylSO₂F, —OCOphenylNO₂, —OCOphenylalkyl, —OCOphenylalkoxy, —COOphenyl, —OCO(fluorosulphonylphenyl), —OalkylCN, —COOalkylOalkyl, —COOalkylOphenyl, —OCOalkylOphenyl, —COOalkylOalkylOalkyl, —OCOalkylCOOalkyl, —OalkylCOOalkyl, —OalkylCOOalkylOalkyl, —OalkylCOOalkylCOOalkyl, —OalkylOCOalkylOalkyl, —COOalkylOCOalkyl or —COOalkylCOOalkyl,

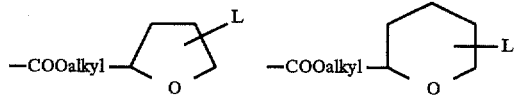

in which L is —H or alkyl, provided that $A^1$ is not 3,5-difluorosulphonylthien-2-yl, that one of $A^1$ or $D^1$ is not 4-fluorosulphonylnaphth-1-yl or substituted 4-hydroxynaphth-1-yl, that one of $A^1$ or $D^1$ does not carry a —NCH$_2$CH$_2$SO$_2$F substituent.

* * * * *